(12) United States Patent
Hsieh et al.

(10) Patent No.: US 8,456,763 B2
(45) Date of Patent: Jun. 4, 2013

(54) IMAGING OPTICAL LENS ASSEMBLY

(75) Inventors: Dung-Yi Hsieh, Taichung (TW);
Hsiang-Chi Tang, Taichung (TW);
Hsin-Hsuan Huang, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 171 days.

(21) Appl. No.: 13/078,309

(22) Filed: Apr. 1, 2011

(65) Prior Publication Data
US 2012/0170142 A1    Jul. 5, 2012

(30) Foreign Application Priority Data
Dec. 30, 2010   (TW) .............................. 099146852 A

(51) Int. Cl.
*G02B 13/04* (2006.01)
*G02B 9/60* (2006.01)

(52) U.S. Cl.
USPC .......................................... 359/753; 359/770

(58) Field of Classification Search
USPC ................. 359/749–756, 761–763, 770–771, 359/781, 680–682
See application file for complete search history.

(56) References Cited

U.S. PATENT DOCUMENTS

| | | | | |
|---|---|---|---|---|
| 4,009,943 | A | * | 3/1977 | Horimoto ...................... 359/723 |
| 4,437,735 | A | * | 3/1984 | Momiyama ................... 359/749 |
| 7,446,955 | B1 | | 11/2008 | Noda |
| 7,944,625 | B2 | * | 5/2011 | Hatada .......................... 359/749 |
| 2010/0277815 | A1 | * | 11/2010 | Wang et al. ................... 359/708 |

* cited by examiner

*Primary Examiner* — Jordan Schwartz
(74) *Attorney, Agent, or Firm* — Morris Manning & Martin LLP; Tim Tingkang Xia, Esq.

(57) ABSTRACT

This invention provides an imaging optical lens assembly, in order from an object side to an image side comprising: a front lens group, an aperture stop and a rear lens group; wherein the front lens group comprises, in order from the object side to the image side: a first lens element with negative refractive power having a concave image-side surface; a second lens element with negative refractive power; a third lens element with positive refractive power and a fourth lens element with positive refractive power; wherein the rear lens group comprises, in order from the object side to the image side: a fifth lens element with positive refractive power; and a sixth lens element with negative refractive power; wherein the fifth lens element and the sixth lens element are connected to form a doublet. By such arrangement, sufficient field of view is provided, and the aberration of the lens assembly is corrected for obtaining high image resolution.

18 Claims, 15 Drawing Sheets

TABLE 8

| | Embodiment 1 | Embodiment 2 | Embodiment 3 | Embodiment 4 | Embodiment 5 | Embodiment 6 | Embodiment 7 |
|---|---|---|---|---|---|---|---|
| f | 2.66 | 1.49 | 1.32 | 2.68 | 1.25 | 1.34 | 1.30 |
| Fno | 2.05 | 2.05 | 2.05 | 2.05 | 2.05 | 2.05 | 2.05 |
| HFOV | 65.9 | 90.2 | 90.2 | 77.0 | 88.9 | 88.9 | 91.5 |
| N6 | 1.847 | 1.847 | 1.847 | 1.847 | 1.847 | 1.847 | 1.847 |
| T23/T34 | 0.36 | 0.12 | 0.23 | 0.70 | 1.41 | 1.33 | 0.36 |
| R4/R5 | 0.35 | 0.30 | −0.20 | 0.43 | 0.23 | 0.26 | 0.21 |
| (Ra+Rb)/(Ra−Rb) | 0.37 | 0.29 | 0.41 | 0.34 | 0.42 | 0.38 | 0.51 |
| (Rc+Rd)/(Rc−Rd) | −1.65 | −1.24 | −2.63 | −1.56 | −1.14 | −0.87 | −1.20 |
| f4/f3 | 1.02 | 0.90 | 1.07 | 0.81 | 0.69 | 0.72 | 0.84 |
| f/f56 | 0.28 | 0.18 | 0.15 | 0.28 | 0.18 | 0.13 | 0.15 |
| f123/f456 | −1.20 | −1.14 | −0.92 | −1.05 | −0.98 | −0.94 | −1.10 |
| Dsa/Td | 0.01 | 0.01 | 0.08 | 0.01 | 0.08 | 0.04 | 0.02 |
| ImgH/f | 1.05 | 1.13 | 1.27 | 1.11 | 1.36 | 1.27 | 1.29 |
| SL/TTL | 0.42 | 0.33 | 0.32 | 0.45 | 0.32 | 0.28 | 0.25 |

Fig. 8

IMAGING OPTICAL LENS ASSEMBLY

CROSS-REFERENCE TO RELATED APPLICATION

This non-provisional application claims priority under 35 U.S.C. §119(a) on Patent Application No. 099146852 filed in Taiwan, R.O.C. on Dec. 30, 2010, the entire contents of which are hereby incorporated by reference.

BACKGROUND OF THE INVENTION

1. Field of the Invention

The present invention relates to an imaging optical lens assembly, and more particularly, to a compact imaging optical lens assembly having a wide field of view used in electronics.

2. Description of the Prior Art

In recent years, the application of optical imaging lens has grown, especially in mobile phone cameras, webcams, automotive lens assemblies, security surveillance cameras and electronic entertainment devices, and the sensor of a general imaging lens is none other than CCD (Charge Coupled Device) or CMOS Sensor (Complementary Metal Oxide Semiconductor Sensor). Furthermore, as advances in semiconductor manufacturing technology have allowed the pixel size of sensors to be reduced and imaging lenses have become more compact with high resolution, there is an increasing demand for imaging lenses featuring better image quality.

Imaging lenses used in vehicle cameras, security surveillance cameras or electronic game devices typically require a larger field of view to capture an image of a larger area at one time. Generally, a conventional imaging lens assembly with a large angle of view, such as the four-element lens assembly disclosed in U.S. Pat. No. 7,446,955, is arranged in such manner that the front lens group has negative refractive power and the rear lens group has positive refractive power, thereby forming an inverse telephoto structure to achieve a wide field of view. While such arrangement facilitates the enlargement of the field of view, the aberration correction of the optical system is ineffective due to the inclusion of only one lens element in the rear lens group. Moreover, vehicles equipped with rear-view cameras have become more and more common, and there is a trend toward high-resolution, wide-angle lenses for rear-view cameras. Therefore, a need exists in the art for a wide-angle imaging lens assembly, which has a wide field of view, high image quality and a moderate total track length.

SUMMARY OF THE INVENTION

The present invention provides an imaging optical lens assembly comprising, in order from an object side to an image side: a front lens group, an aperture stop and a rear lens group; wherein the front lens group comprises, in order from the object side to the image side: a first lens element with negative refractive power having a concave image-side surface; a second lens element with negative refractive power; a third lens element with positive refractive power; and a fourth lens element with positive refractive power; wherein the rear lens group comprises, in order from the object side to the image side: a fifth lens element with positive refractive power; and a sixth lens element with negative refractive power; wherein the fifth lens element and the sixth lens element are connected to form a doublet; a radius of curvature of the image-side surface of the second lens element is R4, a radius of curvature of the object-side surface of the third lens element is R5, a radius of curvature of the object-side surface of the lens element with negative refractive power of the doublet is Rc, a radius of curvature of the image-side surface of the lens element with negative refractive power of the doublet is Rd, and they satisfy the following relations: $-0.5<R4/R5<0.5$; and $-5.0<(Rc+Rd)/(Rc-Rd)<0.0$.

On the other hand, the present invention provides an imaging optical lens assembly comprising six lens elements with refractive power, in order from an object side to an image side: a first lens element with negative refractive power having a concave image-side surface; a second lens element with negative refractive power having a concave image-side surface; a third lens element with positive refractive power; a fourth lens element with positive refractive power; a fifth lens element with positive refractive power; and a sixth lens element with negative refractive power; wherein the fifth lens element and the sixth lens element are connected to form a doublet; a radius of curvature of the image-side surface of the second lens element is R4, a radius of curvature of the object-side surface of the third lens element is R5, an on-axis distance between the aperture stop and the lens element with positive refractive power of the doublet is Dsa, an on-axis distance between the object-side surface of the lens element with refractive power closest to the imaged object and the image-side surface of the lens element with refractive power closest to the image plane of the imaging optical lens assembly is Td, a distance on the optical axis between the aperture stop and an image plane is SL, a distance on the optical axis between the object-side surface of the first lens element and the image plane is TTL, and they satisfy the following relation: $-0.5<R4/R5<0.5$; $-0.1<Dsa/Td<0.09$; and $0.2<SL/TTL<0.5$.

By such arrangement, sufficient field of view is provided, and the aberration of the lens assembly is corrected for obtaining high image resolution.

In the aforementioned imaging optical lens assembly, it is good for the enlargement of the field of view if the first lens element has negative refractive power and a concave image-side surface. When the second lens element has negative refractive power, along with the first lens element, the field of view can be enlarged and the aberration can be corrected. The third lens element has positive refractive power, which thereby can provide partial refractive power for the assembly and is favorable for reducing the total track length thereof. The fourth lens element has positive refractive power, and thereby the sensitivity of the assembly can be favorably reduced. When the fifth lens element has positive refractive power and the sixth lens element has negative refractive power, a positive-negative telephoto structure can be consequently obtained, which is favorable for reducing the total track length of the assembly by shortening the back focal length thereof.

In the aforementioned imaging optical lens assembly, when the first lens element has a convex object-side surface and a concave image-side surface, the field of view of the assembly can be favorably enlarged, and the refraction of the incident light is more moderate for preventing the aberration from being excessively large; therefore, it is favorably for obtaining a better balance between wide field of view and aberration correction. When the second lens element has a convex object-side surface and a concave image-side surface, along with the convex-concave first lens element with negative refractive power, the field of view can be favorably enlarged; when the second lens element has a concave object-side surface and a concave image-side surface, the aberration of the assembly can be favorably corrected.

BRIEF DESCRIPTION OF THE DRAWINGS

FIG. 8 is TABLE 8 which lists the data of the respective embodiments resulting from the equations.

DETAILED DESCRIPTION OF THE PREFERRED EMBODIMENTS

Figure 1A:
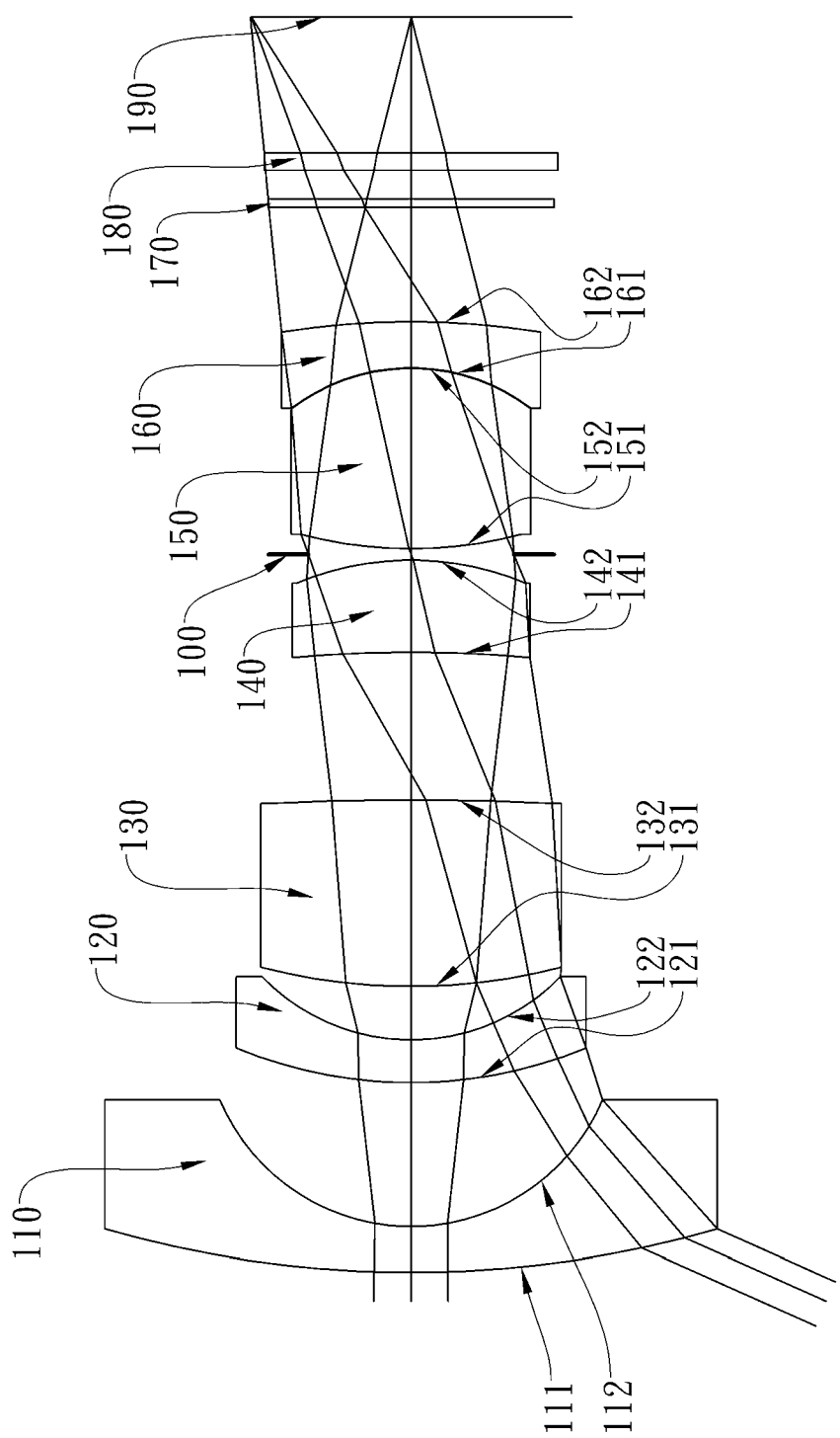
FIG. 1A shows an imaging optical lens assembly in accordance with a first embodiment of the present invention.

The present invention provides an imaging optical lens assembly comprising, in order from an object side to an image side: a front lens group, an aperture stop and a rear lens group; wherein the front lens group comprises, in order from the object side to the image side: a first lens element with negative refractive power having a concave image-side surface; a second lens element with negative refractive power; a third lens element with positive refractive power; and a fourth lens element with positive refractive power; wherein the rear lens group comprises, in order from the object side to the image side: a fifth lens element with positive refractive power; and a sixth lens element with negative refractive power; wherein the fifth lens element and the sixth lens element are connected to form a doublet; a radius of curvature of the image-side surface of the second lens element is R4, a radius of curvature of the object-side surface of the third lens element is R5, a radius of curvature of the object-side surface of the lens element with negative refractive power of the doublet is Rc, a radius of curvature of the image-side surface of the lens element with negative refractive power of the doublet is Rd, and they satisfy the following relations: $-0.5 < R4/R5 < 0.5$; and $-5.0 < (Rc+Rd)/(Rc-Rd) < 0.0$.

When the relation of $-0.5 < R4/R5 < 0.5$ is satisfied, the curvature between the second lens element and the third lens element is more suitable for enlarging the field of view of the assembly effectively.

When the relation of $-5.0 < (Rc+Rd)/(Rc-Rd) < 0.0$ is satisfied, the curvature of the sixth lens element is more suitable for correcting the high order aberration by cooperating with the fifth lens element.

In the aforementioned imaging optical lens assembly, the amount of the lens elements within the front lens group is controlled for providing wide field of view for the assembly, in the meantime, the amount of the lens elements within the rear lens group is controlled for reducing the total track length of the assembly effectively and providing good resolution; preferably, the front lens group comprises at most five lens elements, and the rear lens group comprises at most three lens elements; alternatively, the front lens group comprises only four lens elements and the rear lens group comprises only two lens elements.

In the aforementioned imaging optical lens assembly, a distance on the optical axis between the aperture stop and an image plane is SL, a distance on the optical axis between the object-side surface of the first lens element and the image plane is TTL, and they preferably satisfy the following relation: $0.2 < SL/TTL < 0.5$. When the above relation is satisfied, the arrangement of the aperture stop may be favorable for the enlargement of the field of view of the assembly and reducing the sensitivity thereof.

In the aforementioned imaging optical lens assembly, a radius of curvature of the object-side surface of the lens element with positive refractive power of the doublet is Ra, a radius of curvature of the image-side surface of the lens element with positive refractive power of the doublet is Rb, and they preferably satisfy the following relation: $0.1 < (Ra+Rb)/(Ra-Rb) < 0.7$. When the above relation is satisfied, the curvature of the fifth lens element is more suitable for cooperating with the sixth lens element to reduce the total optical track length effectively; more preferably, the following relation is satisfied: $0.25 < (Ra+Rb)/(Ra-Rb) < 0.55$.

In the aforementioned imaging optical lens assembly, a focal length of the fourth lens element is f4, a focal length of the third lens element is f3, and they preferably satisfy the following relation: $0.5 < f4/f3 < 1.3$. When the above relation is satisfied, the third lens element and the fourth lens element can effectively provide positive refractive power for preventing the sensitivity of the assembly from being excessively high; more preferably, the following relation is satisfied: $0.8 < f4/f3 < 1.2$.

In the aforementioned imaging optical lens assembly, an on-axis distance between the aperture stop and the lens element with positive refractive power of the doublet is Dsa, an on-axis distance between the object-side surface of the lens element with refractive power closest to the imaged object and the image-side surface of the lens element with refractive power closest to the image plane of the imaging optical lens assembly is Td, and they preferably satisfy the following relation: $-0.1 < Dsa/Td < 0.09$. When the above relation is satisfied, the distance between the aperture stop and the object-side surface of the fifth lens element is more suitable, and thereby the aberration of the assembly can be effectively corrected and the total track length thereof is not excessively long.

In the aforementioned imaging optical lens assembly, a refractive index of the sixth lens element is N6, and it preferably satisfies the following relation: $N6 > 1.80$. When the above relation is satisfied, the high order aberration of the assembly can be corrected effectively.

In the aforementioned imaging optical lens assembly, an on-axis spacing between the second lens element and the third lens element is T23, an on-axis spacing between the third lens element and the fourth lens element is T34, and they preferably satisfy the following relation: $0.05<T23/T34<0.80$. When the above relation is satisfied, the arrangement of the third lens element is more suitable for effectively providing wide field of view for the assembly.

In the aforementioned imaging optical lens assembly, a focal length of the imaging optical lens assembly is f, a focal length of the doublet connected by the fifth lens element and the sixth lens element is f56, and they preferably satisfy the following relation: $0.1<f/f56<0.3$. When the above relation is satisfied, the refractive power of the doublet connected by the fifth lens element and the sixth lens element is more suitable for correcting the aberration of the assembly effectively.

In the aforementioned imaging optical lens assembly, a composite focal length of the first lens element, the second lens element and the third lens element is f123, a composite focal length of the fourth lens element, the fifth lens element and the sixth lens element is f456, and they preferably satisfy the following relation: $-1.3<f123/f456<-0.9$. When the above relation is satisfied, the refractive power of the fourth lens element and the doublet connected by the fifth lens element and the sixth lens element is more suitable for correcting the aberration of the assembly effectively and keeping the total track length thereof from being excessively long.

In the aforementioned imaging optical lens assembly, an image sensor is provided on an image plane, half of a diagonal length of an effective sensing area of the image sensor is ImgH, the focal length of the imaging optical lens assembly is f, and they preferably satisfy the following relation: $ImgH/f>1.0$. When the above relation is satisfied, it is favorable for keeping the photographing optical system compact so that it is suitable to be installed in compact electronic products.

In the aforementioned imaging optical lens assembly, half of the maximal field of view of the imaging optical lens assembly is HFOV, and they preferably satisfy the following relation: $HFOV>80$. When the above relation is satisfied, wide field of view of the assembly can be provided.

On the other hand, the present invention provides an imaging optical lens assembly comprising six lens elements with refractive power, in order from an object side to an image side: a first lens element with negative refractive power having a concave image-side surface; a second lens element with negative refractive power having a concave image-side surface; a third lens element with positive refractive power; a fourth lens element with positive refractive power; a fifth lens element with positive refractive power; and a sixth lens element with negative refractive power; wherein the fifth lens element and the sixth lens element are connected to form a doublet; a radius of curvature of the image-side surface of the second lens element is R4, a radius of curvature of the object-side surface of the third lens element is R5, an on-axis distance between the aperture stop and the lens element with positive refractive power of the doublet is Dsa, an on-axis distance between the object-side surface of the lens element with refractive power closest to the imaged object and the image-side surface of the lens element with refractive power closest to the image plane of the imaging optical lens assembly is Td, a distance on the optical axis between the aperture stop and an image plane is SL, a distance on the optical axis between the object-side surface of the first lens element and the image plane is TTL, and they satisfy the following relation: $-0.5<R4/R5<0.5$; $-0.1<Dsa/Td<0.09$; and $0.2<SL/TTL<0.5$.

When the relation of $-0.5<R4/R5<0.5$ is satisfied, the curvature between the second lens element and the third lens element is more suitable for enlarging the field of view of the assembly effectively.

When the relation of $-0.1<Dsa/Td<0.09$ is satisfied, the distance between the aperture stop and the object-side surface of the fifth lens element is more suitable, and thereby the aberration of the assembly can be effectively corrected and the total track length thereof is not excessively long.

When the relation of $0.2<SL/TTL<0.5$ is satisfied, the arrangement of the aperture stop may be favorable for the enlargement of the field of view of the assembly and reducing the sensitivity thereof.

In the aforementioned imaging optical lens assembly, a radius of curvature of the object-side surface of the lens element with negative refractive power of the doublet is Rc, a radius of curvature of the image-side surface of the lens element with negative refractive power of the doublet is Rd, and they preferably satisfy the following relation: $-5.0<(Rc+Rd)/(Rc-Rd)<0.0$. When the above relation is satisfied, the curvature of the sixth lens element is more suitable for correcting the high order aberration by cooperating with the fifth lens element; more preferably, the following relation is satisfied: $-3.0<(Rc+Rd)/(Rc-Rd)<-0.6$.

In the aforementioned imaging optical lens assembly, a focal length of the imaging optical lens assembly is f, a focal length of the doublet connected by the fifth lens element and the sixth lens element is f56, and they preferably satisfy the following relation: $0.1<f/f56<0.3$. When the above relation is satisfied, the refractive power of the doublet cemented by the fifth lens element and the sixth lens element is more suitable for correcting the aberration of the assembly effectively.

In the aforementioned imaging optical lens assembly, a radius of curvature of the object-side surface of the lens element with positive refractive power of the doublet is Ra, a radius of curvature of the image-side surface of the lens element with positive refractive power of the doublet is Rb, and they preferably satisfy the following relation: $0.25<(Ra+Rb)/(Ra-Rb)<0.55$. When the above relation is satisfied, the curvature of the fifth lens element is more suitable for cooperating with the sixth lens element to reducing the total optical track length effectively.

In the aforementioned imaging optical lens assembly, a composite focal length of the first lens element, the second lens element and the third lens element is f123, a composite focal length of the fourth lens element, the fifth lens element and the sixth lens element is f456, and they preferably satisfy the following relation: $-1.3<f123/f456<-0.9$. When the above relation is satisfied, the refractive power of the fourth lens element and the doublet connected by the fifth lens element and the sixth lens element is more suitable for correcting the aberration of the assembly effectively and keeping the total track length thereof from being excessively long.

In the aforementioned imaging optical lens assembly, a focal length of the fourth lens element is f4, a focal length of the third lens element is f3, and they preferably satisfy the following relation: $0.8<f4/f3<1.2$. When the above relation is satisfied, the third lens element and the fourth lens element can effectively provide positive refractive power for preventing the sensitivity of the assembly from being excessively high.

In the aforementioned imaging optical lens assembly, an on-axis spacing between the second lens element and the third lens element is T23, an on-axis spacing between the third lens element and the fourth lens element is T34, and they preferably satisfy the following relation: $0.05<T23/T34<0.80$. When the above relation is satisfied, the arrangement of the third lens element is more suitable for effectively providing the assembly wide field of view.

In the aforementioned imaging optical lens assembly, a refractive index of the sixth lens element is N6, and it preferably satisfies the following relation: N6>1.80. When the above relation is satisfied, the high order aberration of the assembly can be corrected effectively.

In the aforementioned imaging optical lens assembly, the lens elements can be made of glass or plastic material. If the lens elements are made of glass, the freedom for distributing the refractive power of the imaging optical lens assembly can be increased. If plastic material is adopted to produce the lens elements, the production cost will be reduced effectively.

In the present imaging optical lens assembly, if a lens element is described to have a convex surface, it means the portion of the surface in proximity to the optical axis is convex; if a lens element is described to have a concave surface, it means the portion of the surface in proximity to the optical axis is concave.

In the present imaging optical lens assembly, there can be at least one field stop provided for eliminating stray light and thereby promoting image resolution thereof.

Preferred embodiments of the present invention will be described in the following paragraphs by referring to the accompanying drawings.

Embodiment 1

Figure 1B:
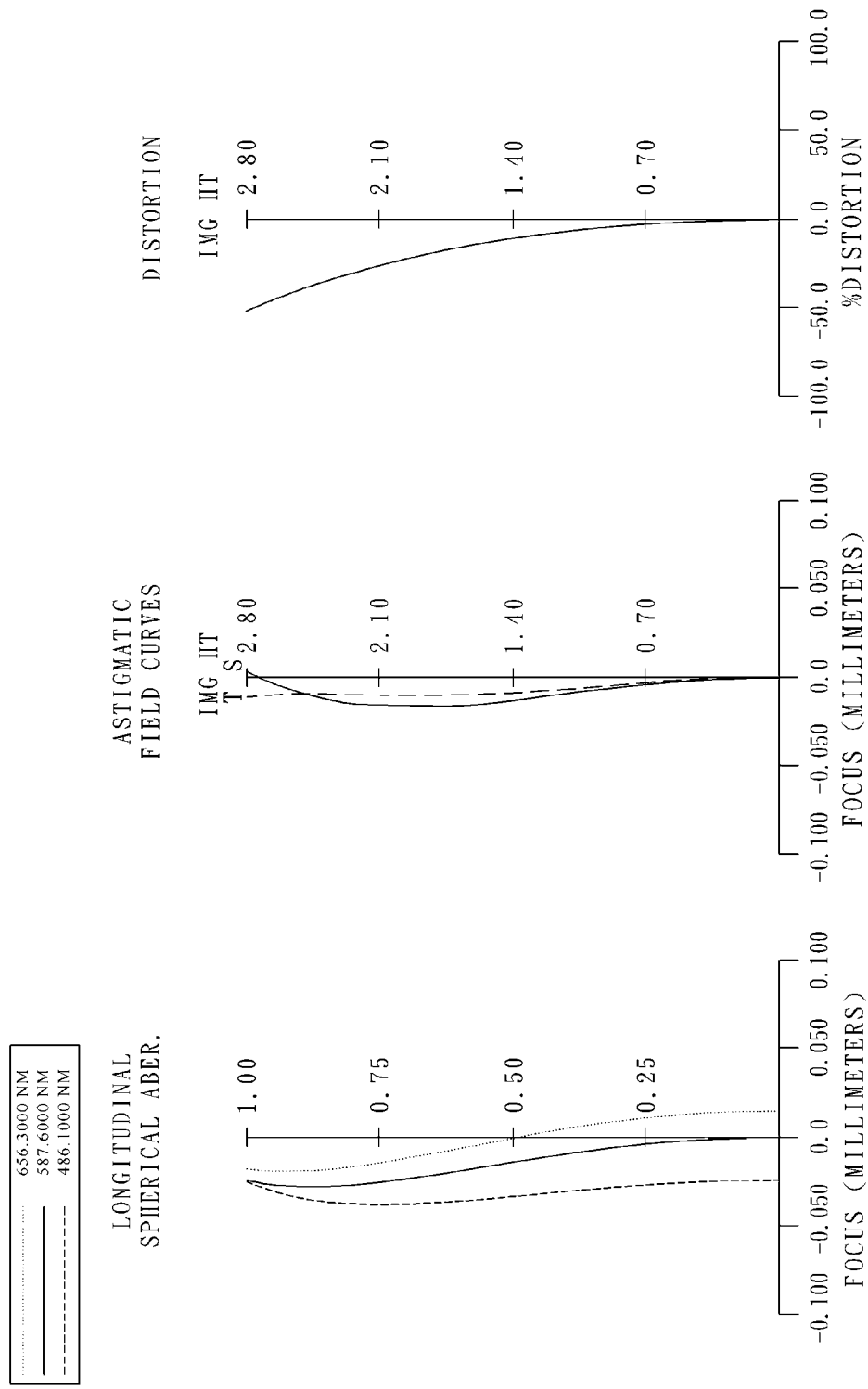
FIG. 1B shows the aberration curves of the first embodiment of the present invention.

FIG. 1A shows an imaging optical lens assembly in accordance with the first embodiment of the present invention, and FIG. 1B shows the aberration curves of the first embodiment of the present invention. The imaging optical lens assembly of the first embodiment of the present invention comprises, in order from an object side to an image side: a front lens group, an aperture stop 100 and a rear lens group; wherein the front lens group comprises, in order from the object side to the image side:

a glass first lens element 110 with negative refractive power having a convex object-side surface 111 and a concave image-side surface 112;

a glass second lens element 120 with negative refractive power having a convex object-side surface 121 and a concave image-side surface 122;

a glass third lens element 130 with positive refractive power having a convex object-side surface 131 and a convex image-side surface 132; and a glass fourth lens element 140 with positive refractive power having a concave object-side surface 141 and a convex image-side surface 142;

wherein the rear lens group comprises, in order from the object side to the image side:

a glass fifth lens element 150 with positive refractive power having a convex object-side surface 151 and a convex image-side surface 152; and a glass sixth lens element 160 with negative refractive power having a concave object-side surface 161 and a convex image-side surface 162;

wherein the fifth lens element 150 and the sixth lens element 160 are cemented with each other to form a doublet; in the first embodiment of the present imaging optical lens assembly, the lens element with positive refractive power within the doublet is the fifth lens element 150, and the lens element with negative refractive power within the doublet is the sixth lens element 160;

wherein the aperture stop 100 is disposed between the fourth lens element 140 and the fifth lens element 150;

the imaging optical lens assembly further comprises an IR filter 170 disposed between the image-side surface 162 of the sixth lens element 160 and a cover glass 180, and the IR filter 170 is made of glass and has no influence on the focal length of the imaging optical lens assembly; the imaging optical lens assembly further comprises an image sensor provided on an image plane 190.

The detailed optical data of the first embodiment is shown in TABLE 1, wherein the units of the radius of curvature, the thickness and the focal length are expressed in mm, and HFOV is half of the maximal field of view.

TABLE 1

(Embodiment 1)
f = 2.66 mm, Fno = 2.05, HFOV = 65.9 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 19.235300 | 0.800 | Glass | 1.772 | 49.6 | −5.94 |
| 2 | | 3.639000 | 2.520 | | | | |
| 3 | Lens 2 | 8.036100 | 0.750 | Glass | 1.806 | 40.9 | −8.93 |
| 4 | | 3.638400 | 0.934 | | | | |
| 5 | Lens 3 | 10.385700 | 3.270 | Glass | 1.847 | 23.8 | 10.35 |
| 6 | | −47.846500 | 2.590 | | | | |
| 7 | Lens 4 | −22.663400 | 1.610 | Glass | 1.620 | 60.3 | 10.55 |
| 8 | | −5.215600 | 0.100 | | | | |
| 9 | Ape. Stop | Plano | 0.100 | | | | |
| 10 | Lens 5 | 7.483200 | 3.160 | Glass | 1.697 | 55.5 | 3.85 |
| 11 | | −3.462500 | 0.010 | Cement | | | |
| 12 | Lens 6 | −3.460400 | 0.810 | Glass | 1.847 | 23.8 | −5.62 |
| 13 | | −14.060200 | 2.000 | | | | |
| 14 | IR-filter | Plano | 0.150 | Glass | 1.517 | 64.2 | — |
| 15 | | Plano | 0.500 | | | | |
| 16 | Cover-glass | Plano | 0.300 | Glass | 1.517 | 64.2 | — |
| 17 | | Plano | 2.380 | | | | |
| 18 | Image | Plano | — | | | | |

Note:
Reference wavelength is d-line 587.6 mm
Lens 5 and lens 6 are connected with each other In the first embodiment of the present imaging optical lens assembly, the focal length of the imaging optical lens assembly is f, and it satisfies the relation: f=2.66 (mm).

In the first embodiment of the present imaging optical lens assembly, the f-number of the imaging optical lens assembly is Fno, and it satisfies the relation: Fno=2.05.

In the first embodiment of the present imaging optical lens assembly, half of the maximal field of view of the imaging optical lens assembly is HFOV, and it satisfies the relation: HFOV=65.9 deg.

In the first embodiment of the present imaging optical lens assembly, a refractive index of the sixth lens element 160 is N6, and it satisfies the following relation: N6=1.847.

In the first embodiment of the present imaging optical lens assembly, the on-axis spacing between the second lens element 120 and the third lens element 130 is T23, the on-axis spacing between the third lens element 130 and the fourth lens element 140 is T34, and they satisfy the relation: T23/T34=0.36.

In the first embodiment of the present imaging optical lens assembly, the radius of curvature of the image-side surface 122 of the second lens element 120 is R4, the radius of curvature of the object-side surface 131 of the third lens element 130 is R5, and they satisfy the relation: R4/R5=0.35.

In the first embodiment of the present imaging optical lens assembly, a radius of curvature of the object-side surface of the lens element with positive refractive power of the doublet is Ra, a radius of curvature of the image-side surface of the lens element with positive refractive power of the doublet is Rb, and they satisfy the following relation: (Ra+Rb)/(Ra−Rb)= 0.37.

In the first embodiment of the present imaging optical lens assembly, a radius of curvature of the object-side surface of the lens element with negative refractive power of the doublet is Rc, a radius of curvature of the image-side surface of the lens element with negative refractive power of the doublet is Rd, and they satisfy the following relation: (Rc+Rd)/(Rc−Rd)= −1.65.

In the first embodiment of the present imaging optical lens assembly, the focal length of the fourth lens element 140 is f4, the focal length of the third lens element 130 is f3, and they satisfy the relation: f4/f3=1.02.

In the first embodiment of the present imaging optical lens assembly, a focal length of the imaging optical lens assembly is f, a focal length of the doublet connected by the fifth lens element 150 and the sixth lens element 160 is f56, and they satisfy the following relation: f/f56=0.28.

In the first embodiment of the present imaging optical lens assembly, a composite focal length of the first lens element 110, the second lens element 120 and the third lens element 130 is f123, a composite focal length of the fourth lens element 140, the fifth lens element 150 and the sixth lens element 160 is f456, and they satisfy the following relation: f123/f456=−1.20.

In the first embodiment of the present imaging optical lens assembly, an on-axis distance between the aperture stop 100 and the lens element with positive refractive power of the doublet is Dsa, an on-axis distance between the object-side surface 111 of the first lens element 110 and the image-side surface 162 of the sixth lens element 160 is Td, and they satisfy the following relation: Dsa/Td=0.01.

In the first embodiment of the present imaging optical lens assembly, half of the diagonal length of the effective sensing area of the image sensor is ImgH, a focal length of the imaging optical lens assembly is f, and they satisfy the following relation: ImgH/f=1.05.

In the first embodiment of the present imaging optical lens assembly, the distance on the optical axis between the aperture stop 100 and the image plane 190 is SL, the distance on the optical axis between the object-side surface 111 of the first lens element 110 and the image plane 190 is TTL, and they satisfy the relation: SL/TTL=0.42.

Embodiment 2

Figure 2A:
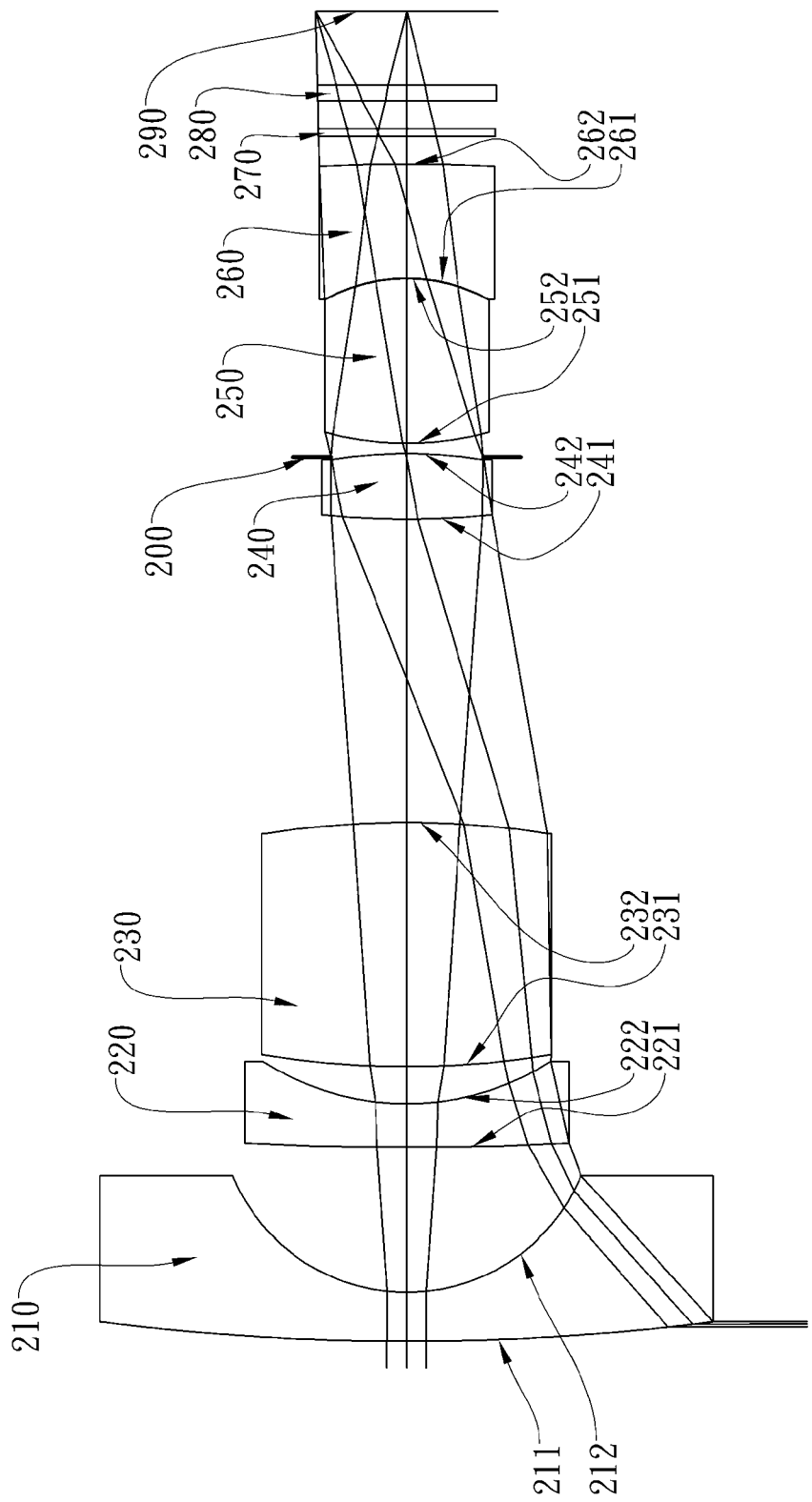
FIG. 2A shows an imaging optical lens assembly in accordance with a second embodiment of the present invention.
Figure 2B:
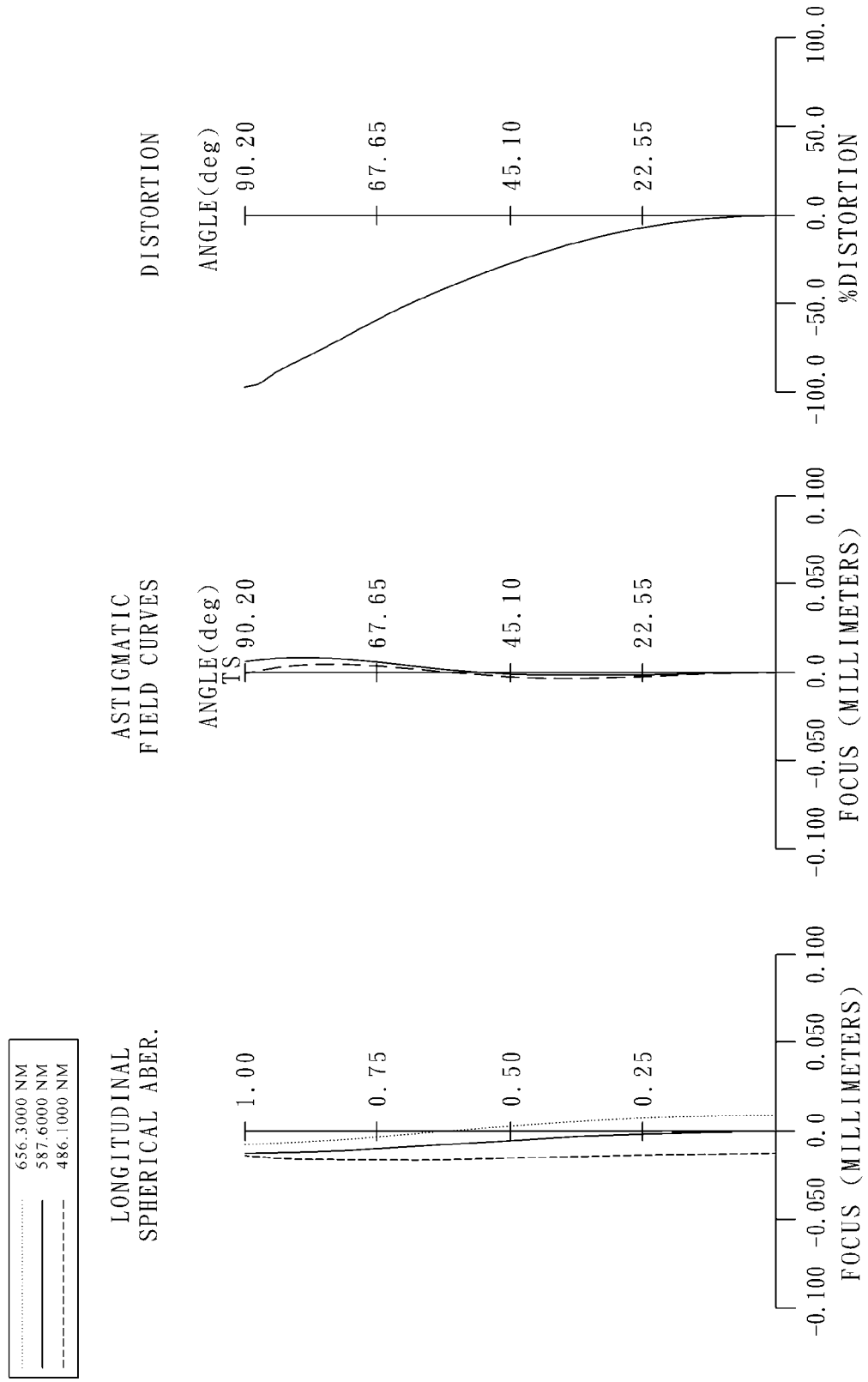
FIG. 2B shows the aberration curves of the second embodiment of the present invention.

FIG. 2A shows an imaging optical lens assembly in accordance with the second embodiment of the present invention, and FIG. 2B shows the aberration curves of the second embodiment of the present invention. The imaging optical lens assembly of the second embodiment of the present invention comprises, in order from an object side to an image side: a front lens group, an aperture stop 200 and a rear lens group; wherein the front lens group comprises, in order from the object side to the image side:

a glass first lens element 210 with negative refractive power having a convex object-side surface 211 and a concave image-side surface 212;

a glass second lens element 220 with negative refractive power having a convex object-side surface 221 and a concave image-side surface 222;

a glass third lens element 230 with positive refractive power having a convex object-side surface 231 and a convex image-side surface 232; and a glass fourth lens element 240 with positive refractive power having a convex object-side surface 241 and a convex image-side surface 242;

wherein the rear lens group comprises, in order from the object side to the image side:

a glass fifth lens element 250 with positive refractive power having a convex object-side surface 251 and a convex image-side surface 252; and a glass sixth lens element 260 with negative refractive power having a concave object-side surface 261 and a convex image-side surface 262;

wherein the fifth lens element 250 and the sixth lens element 260 are cemented with each other to form a doublet; in the second embodiment of the present imaging optical lens assembly, the lens element with positive refractive power within the doublet is the fifth lens element 250, and the lens element with negative refractive power within the doublet is the sixth lens element 260;

wherein the aperture stop 200 is disposed between the fourth lens element 240 and the fifth lens element 250;

the imaging optical lens assembly further comprises an IR filter 270 disposed between the image-side surface 262 of the sixth lens element 260 and a cover glass 280, and the IR filter 270 is made of glass and has no influence on the focal length of the imaging optical lens assembly; the imaging optical lens assembly further comprises an image sensor provided on an image plane 290.

The detailed optical data of the second embodiment is shown in TABLE 2, wherein the units of the radius of curvature, the thickness and the focal length are expressed in mm, and HFOV is half of the maximal field of view.

TABLE 2

(Embodiment 2)
f = 1.49 mm, Fno = 2.05, HFOV = 90.2 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 44.642857 | 0.900 | Glass | 1.729 | 54.5 | −5.22 |
| 2 | | 3.475605 | 2.665 | | | | |
| 3 | Lens 2 | 57.741676 | 0.800 | Glass | 1.804 | 46.6 | −6.66 |
| 4 | | 4.872857 | 0.686 | | | | |
| 5 | Lens 3 | 16.295967 | 4.500 | Glass | 1.847 | 23.8 | 10.27 |
| 6 | | −16.295967 | 5.587 | | | | |
| 7 | Lens 4 | 15.396205 | 1.212 | Glass | 1.619 | 60.3 | 9.25 |
| 8 | | −8.830435 | −0.064 | | | | |
| 9 | Ape. Stop | Plano | 0.247 | | | | |
| 10 | Lens 5 | 5.586419 | 3.040 | Glass | 1.729 | 54.5 | 3.20 |
| 11 | | −3.086420 | 0.010 | Cement | | | |
| 12 | Lens 6 | −3.086420 | 2.105 | Glass | 1.847 | 23.8 | −4.24 |
| 13 | | −28.881458 | 0.500 | | | | |
| 14 | IR-filter | Plano | 0.150 | Glass | 1.517 | 64.2 | — |
| 15 | | Plano | 0.500 | | | | |
| 16 | Cover-glass | Plano | 0.300 | Glass | 1.517 | 64.2 | — |
| 17 | | Plano | 1.358 | | | | |
| 18 | Image | Plano | — | | | | |

Note:
Reference wavelength is d-line 587.6 mm
Lens 5 and lens 6 are connected with each other In the second embodiment of the present imaging optical lens assembly, the focal length of the imaging optical lens assembly is f, and it satisfies the relation: f=1.49 (mm).

In the second embodiment of the present imaging optical lens assembly, the f-number of the imaging optical lens assembly is Fno, and it satisfies the relation: Fno=2.05.

In the second embodiment of the present imaging optical lens assembly, half of the maximal field of view of the imaging optical lens assembly is HFOV, and it satisfies the relation: HFOV=90.2 deg.

In the second embodiment of the present imaging optical lens assembly, a refractive index of the sixth lens element 260 is N6, and it satisfies the following relation: N6=1.847.

In the second embodiment of the present imaging optical lens assembly, the on-axis spacing between the second lens element 220 and the third lens element 230 is T23, the on-axis spacing between the third lens element 230 and the fourth lens element 240 is T34, and they satisfy the relation: T23/T34=0.12.

In the second embodiment of the present imaging optical lens assembly, the radius of curvature of the image-side surface 222 of the second lens element 220 is R4, the radius of curvature of the object-side surface 231 of the third lens element 230 is R5, and they satisfy the relation: R4/R5=0.30.

In the second embodiment of the present imaging optical lens assembly, a radius of curvature of the object-side surface of the lens element with positive refractive power of the doublet is Ra, a radius of curvature of the image-side surface of the lens element with positive refractive power of the doublet is Rb, and they satisfy the following relation: (Ra+Rb)/(Ra−Rb)=0.29.

In the second embodiment of the present imaging optical lens assembly, a radius of curvature of the object-side surface of the lens element with negative refractive power of the doublet is Rc, a radius of curvature of the image-side surface of the lens element with negative refractive power of the doublet is Rd, and they satisfy the following relation: (Rc+Rd)/(Rc−Rd)=−1.24.

In the second embodiment of the present imaging optical lens assembly, the focal length of the fourth lens element 240 is f4, the focal length of the third lens element 230 is f3, and they satisfy the relation: f4/f3=0.90.

In the second embodiment of the present imaging optical lens assembly, a focal length of the imaging optical lens assembly is f, a focal length of the doublet connected by the fifth lens element 250 and the sixth lens element 260 is f56, and they satisfy the following relation: f/f56=0.18.

In the second embodiment of the present imaging optical lens assembly, a composite focal length of the first lens element 210, the second lens element 220 and the third lens element 230 is f123, a composite focal length of the fourth lens element 240, the fifth lens element 250 and the sixth lens element 260 is f456, and they satisfy the following relation: f123/f456=−1.14.

In the second embodiment of the present imaging optical lens assembly, an on-axis distance between the aperture stop 200 and the lens element with positive refractive power of the doublet is Dsa, an on-axis distance between the object-side surface 211 of the first lens element 210 and the image-side surface 262 of the sixth lens element 260 is Td, and they satisfy the following relation: Dsa/Td=0.01.

In the second embodiment of the present imaging optical lens assembly, half of the diagonal length of the effective sensing area of the image sensor is ImgH, a focal length of the imaging optical lens assembly is f, and they satisfy the following relation: ImgH/f=1.13.

In the second embodiment of the present imaging optical lens assembly, the distance on the optical axis between the aperture stop 200 and the image plane 290 is SL, the distance on the optical axis between the object-side surface 211 of the first lens element 210 and the image plane 290 is TTL, and they satisfy the relation: SL/TTL=0.33.

Embodiment 3

Figure 3A:
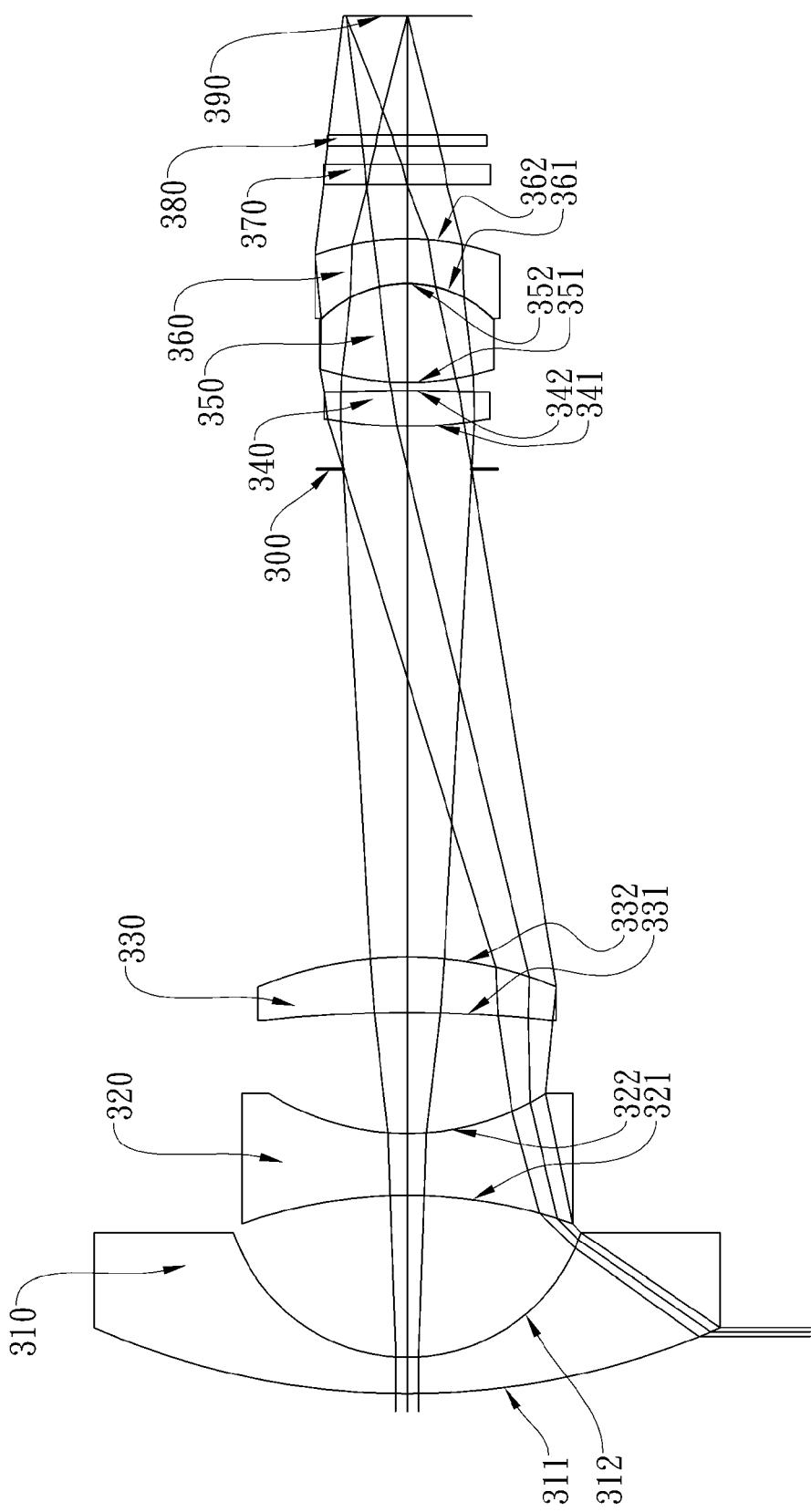
FIG. 3A shows an imaging optical lens assembly in accordance with a third embodiment of the present invention.
Figure 3B:
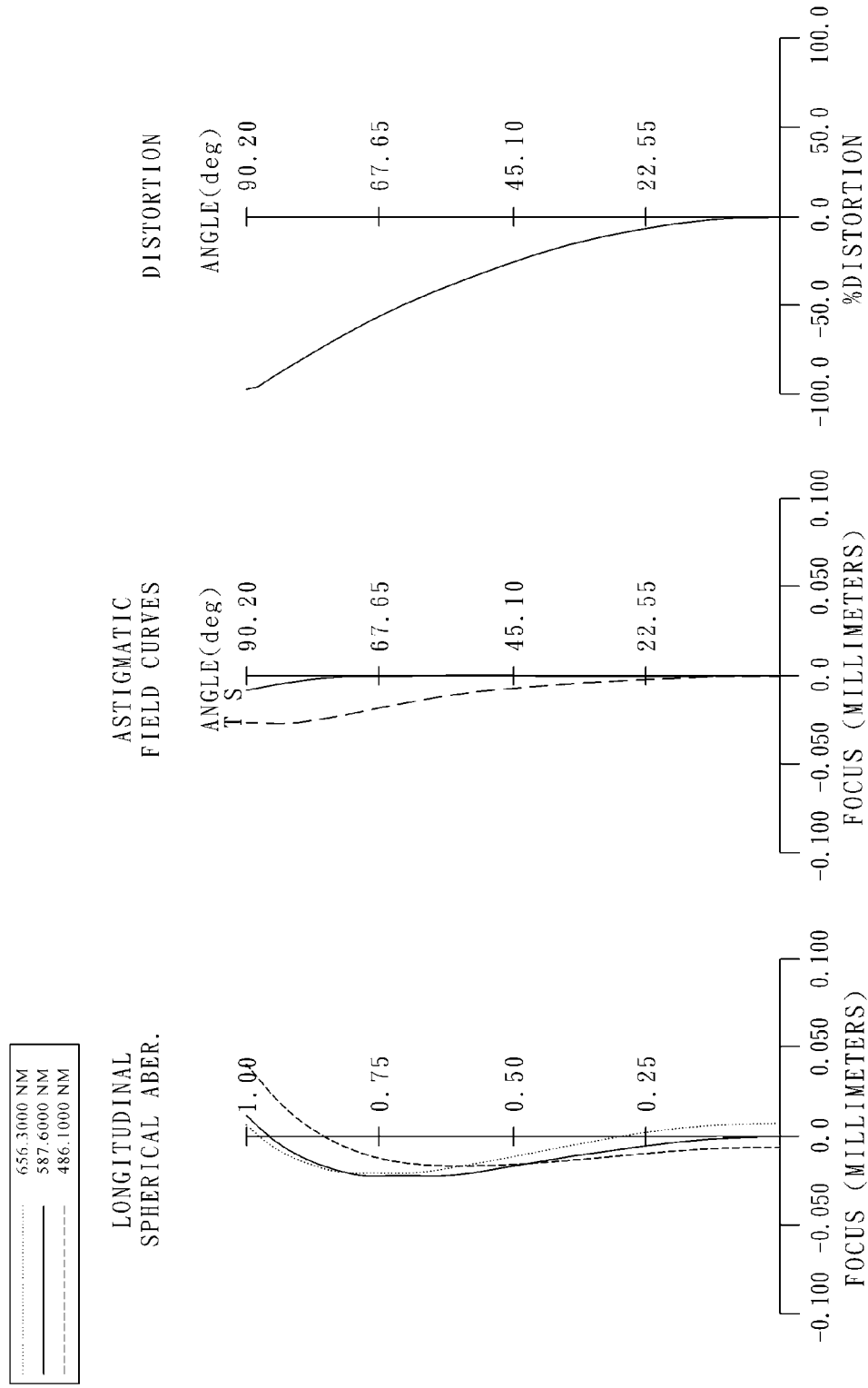
FIG. 3B shows the aberration curves of the third embodiment of the present invention.

FIG. 3A shows an imaging optical lens assembly in accordance with the third embodiment of the present invention, and FIG. 3B shows the aberration curves of the third embodiment of the present invention. The imaging optical lens assembly of the third embodiment of the present invention comprises, in order from an object side to an image side: a front lens group, an aperture stop 300 and a rear lens group; wherein the front lens group comprises, in order from the object side to the image side:

a glass first lens element 310 with negative refractive power having a convex object-side surface 311 and a concave image-side surface 312;

a glass second lens element 320 with negative refractive power having a concave object-side surface 321 and a concave image-side surface 322; and a glass third lens element 330 with positive refractive power having a concave object-side surface 331 and a convex image-side surface 332;

wherein the rear lens group comprises, in order from the object side to the image side:

a glass fourth lens element 340 with positive refractive power having a convex object-side surface 341 and a convex image-side surface 342;

a glass fifth lens element 350 with positive refractive power having a convex object-side surface 351 and a convex image-side surface 352; and a glass sixth lens element 360 with negative refractive power having a concave object-side surface 361 and a convex image-side surface 362;

wherein the fifth lens element 350 and the sixth lens element 360 are cemented with each other to form a doublet; in the third embodiment of the present imaging optical lens assembly, the lens element with positive refractive power within the doublet is the fifth lens element 350, and the lens element with negative refractive power within the doublet is the sixth lens element 360;

wherein the aperture stop 300 is disposed between the third lens element 330 and the fourth lens element 340;

the imaging optical lens assembly further comprises an IR filter 370 disposed between the image-side surface 362 of the sixth lens element 360 and a cover glass 380, and the IR filter 370 is made of glass and has no influence on the focal length of the imaging optical lens assembly; the imaging optical lens assembly further comprises an image sensor provided on an image plane 390.

The detailed optical data of the third embodiment is shown in TABLE 3, wherein the units of the radius of curvature, the thickness and the focal length are expressed in mm, and HFOV is half of the maximal field of view.

In the third embodiment of the present imaging optical lens assembly, the focal length of the imaging optical lens assembly is f, and it satisfies the relation: f=1.32 (mm).

In the third embodiment of the present imaging optical lens assembly, the f-number of the imaging optical lens assembly is Fno, and it satisfies the relation: Fno=2.05.

In the third embodiment of the present imaging optical lens assembly, half of the maximal field of view of the imaging optical lens assembly is HFOV, and it satisfies the relation: HFOV=90.2 deg.

In the third embodiment of the present imaging optical lens assembly, a refractive index of the sixth lens element 360 is N6, and it satisfies the following relation: N6=1.847.

In the third embodiment of the present imaging optical lens assembly, the on-axis spacing between the second lens element 320 and the third lens element 330 is T23, the on-axis spacing between the third lens element 330 and the fourth lens element 340 is T34, and they satisfy the relation: T23/T34=0.23.

In the third embodiment of the present imaging optical lens assembly, the radius of curvature of the image-side surface 322 of the second lens element 320 is R4, the radius of curvature of the object-side surface 331 of the third lens element 330 is R5, and they satisfy the relation: R4/R5=−0.20.

In the third embodiment of the present imaging optical lens assembly, a radius of curvature of the object-side surface of the lens element with positive refractive power of the doublet is Ra, a radius of curvature of the image-side surface of the lens element with positive refractive power within the doublet is Rb, and they satisfy the following relation: (Ra+Rb)/(Ra−Rb)=0.41.

In the third embodiment of the present imaging optical lens assembly, a radius of curvature of the object-side surface of the lens element with negative refractive power of the doublet is Rc, a radius of curvature of the image-side surface of the lens element with negative refractive power within the doublet is Rd, and they satisfy the following relation: (Rc+Rd)/(Rc−Rd)=−2.63.

TABLE 3

(Embodiment 3)
f = 1.32 mm, Fno = 2.05, HFOV = 90.2 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 21.327100 | 1.000 | Glass | 1.729 | 54.5 | −9.34 |
| 2 | | 5.059800 | 4.460 | | | | |
| 3 | Lens 2 | −13.527200 | 1.700 | Glass | 1.729 | 54.5 | −6.18 |
| 4 | | 7.122100 | 3.340 | | | | |
| 5 | Lens 3 | −35.616800 | 1.530 | Glass | 1.847 | 23.8 | 17.55 |
| 6 | | −10.692600 | 13.460 | | | | |
| 7 | Ape. Stop | Plano | 1.180 | | | | |
| 8 | Lens 4 | 11.920500 | 0.990 | Glass | 1.517 | 64.2 | 18.71 |
| 9 | | −49.761100 | 0.220 | | | | |
| 10 | Lens 5 | 8.001800 | 2.730 | Glass | 1.620 | 60.3 | 4.20 |
| 11 | | −3.359700 | 0.010 | Cement | | | |
| 12 | Lens 6 | −3.357900 | 1.230 | Glass | 1.847 | 23.8 | −8.33 |
| 13 | | −7.482900 | 1.500 | | | | |
| 14 | IR-filter | Plano | 0.550 | Glass | 1.517 | 64.2 | — |
| 15 | | Plano | 0.500 | | | | |
| 16 | Cover-glass | Plano | 0.300 | Glass | 1.517 | 64.2 | — |
| 17 | | Plano | 3.292 | | | | |
| 18 | Image | Plano | — | | | | |

Note:
Reference wavelength is d-line 587.6 mm
Lens 5 and lens 6 are connected with each other In the third embodiment of the present imaging optical lens assembly, the focal length of the fourth lens element 340 is f4, the focal length of the third lens element 330 is f3, and they satisfy the relation: f4/f3=1.07.

In the third embodiment of the present imaging optical lens assembly, a focal length of the imaging optical lens assembly is f, a focal length of the doublet connected by the fifth lens element 350 and the sixth lens element 360 is f56, and they satisfy the following relation: f/f56=0.15.

In the third embodiment of the present imaging optical lens assembly, a composite focal length of the first lens element 310, the second lens element 320 and the third lens element 330 is f123, a composite focal length of the fourth lens element 340, the fifth lens element 350 and the sixth lens element 360 is f456, and they satisfy the following relation: f123/f456=−0.92.

In the third embodiment of the present imaging optical lens assembly, an on-axis distance between the aperture stop 300 and the lens element with positive refractive power of the doublet is Dsa, an on-axis distance between the object-side surface 311 of the first lens element 310 and the image-side surface 362 of the sixth lens element 360 is Td, and they satisfy the following relation: Dsa/Td=0.08.

In the third embodiment of the present imaging optical lens assembly, half of the diagonal length of the effective sensing area of the image sensor is ImgH, a focal length of the imaging optical lens assembly is f, and they satisfy the following relation: ImgH/f=1.27.

In the third embodiment of the present imaging optical lens assembly, the distance on the optical axis between the aperture stop 300 and the image plane 390 is SL, the distance on the optical axis between the object-side surface 311 of the first lens element 310 and the image plane 390 is TTL, and they satisfy the relation: SL/TTL=0.32.

Embodiment 4

Figure 4A:
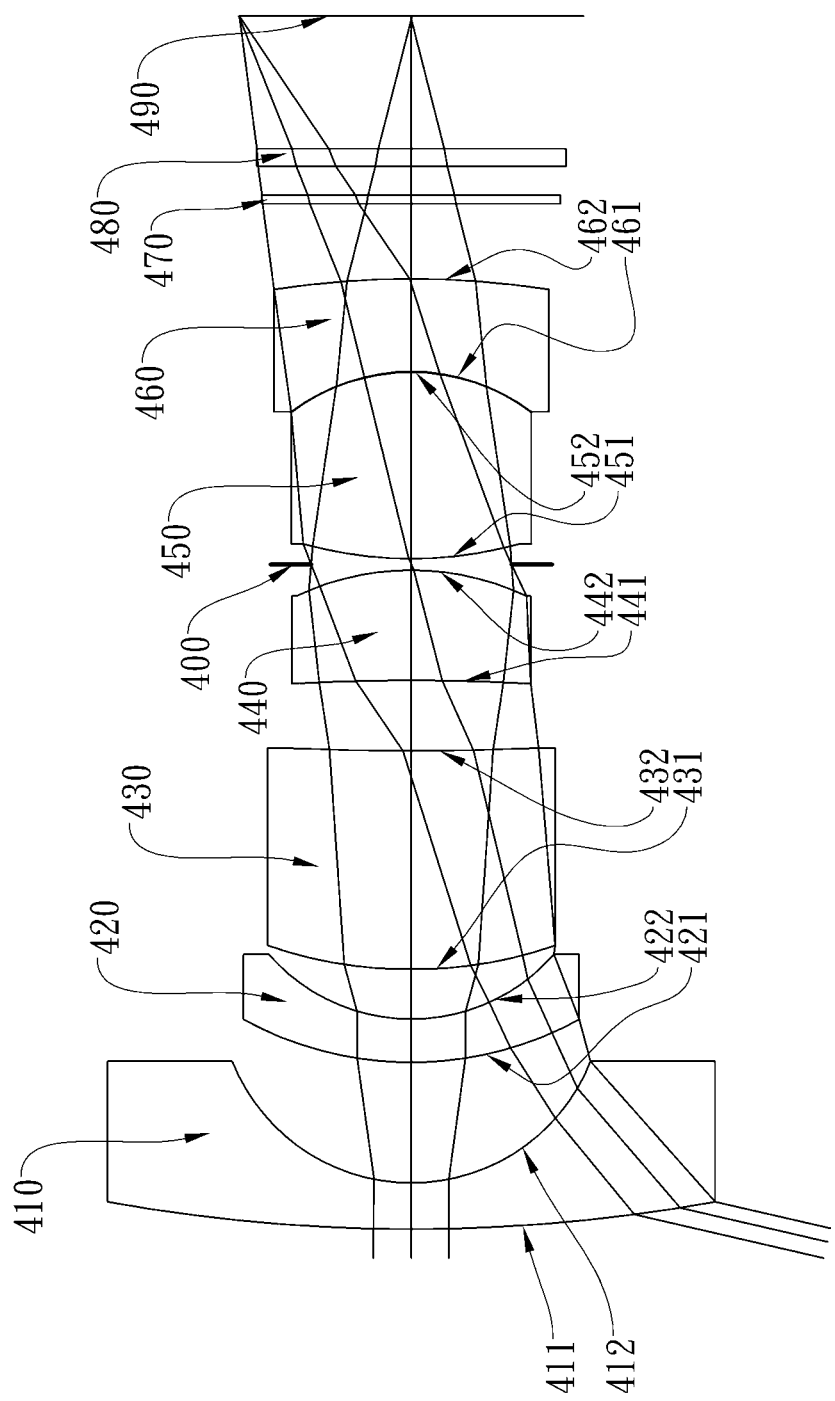
FIG. 4A shows an imaging optical lens assembly in accordance with a fourth embodiment of the present invention.
Figure 4B:
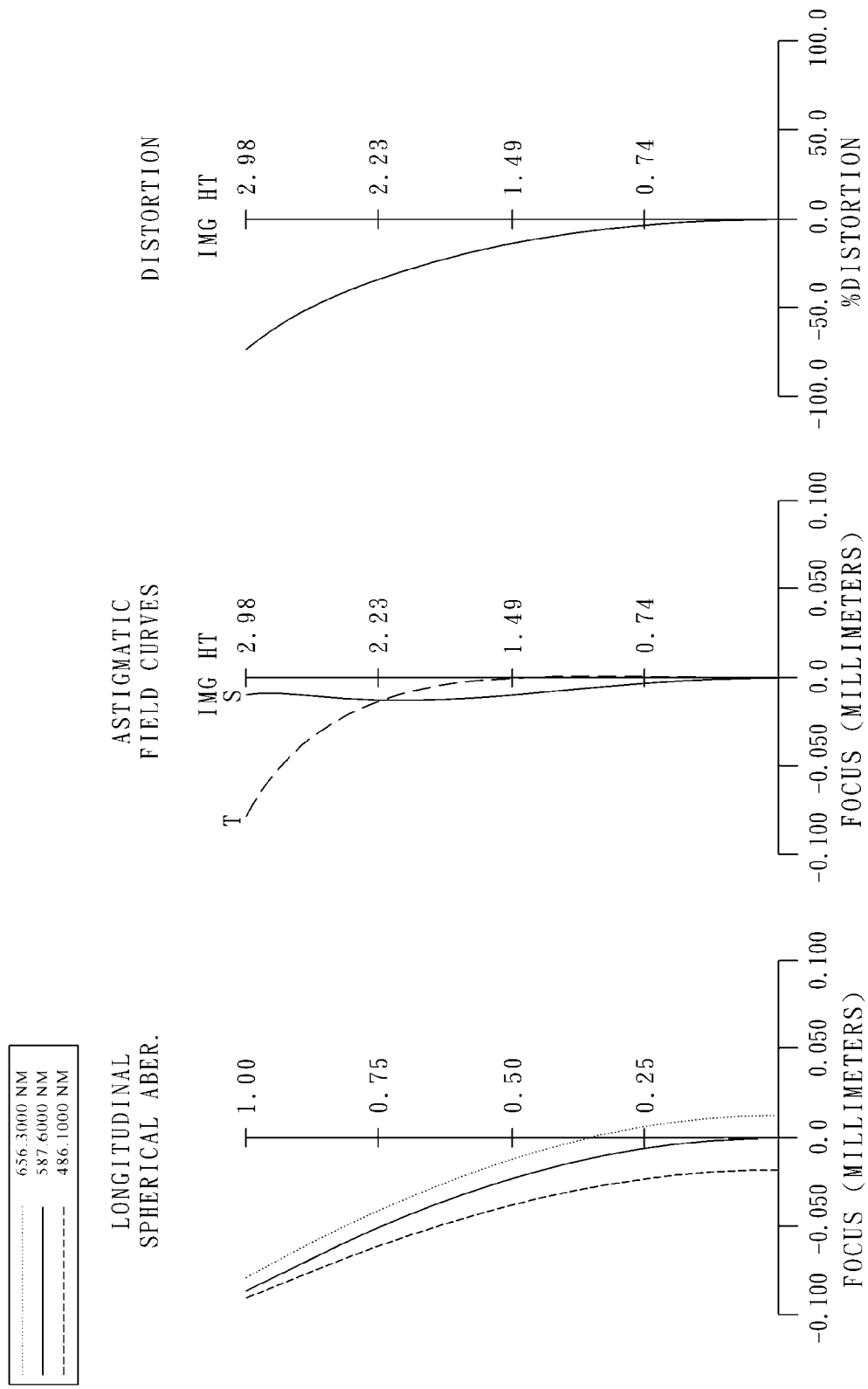
FIG. 4B shows the aberration curves of the fourth embodiment of the present invention.

FIG. 4A shows an imaging optical lens assembly in accordance with the fourth embodiment of the present invention, and FIG. 4B shows the aberration curves of the fourth embodiment of the present invention. The imaging optical lens assembly of the fourth embodiment of the present invention comprises, in order from an object side to an image side: a front lens group, an aperture stop 400 and a rear lens group; wherein the front lens group comprises, in order from the object side to the image side:

a glass first lens element 410 with negative refractive power having a convex object-side surface 411 and a concave image-side surface 412;

a glass second lens element 420 with negative refractive power having a convex object-side surface 421 and a concave image-side surface 422;

a glass third lens element 430 with positive refractive power having a convex object-side surface 431 and a concave image-side surface 432; and a glass fourth lens element 440 with positive refractive power having a concave object-side surface 441 and a convex image-side surface 442;

wherein the rear lens group comprises, in order from the object side to the image side:

a glass fifth lens element 450 with positive refractive power having a convex object-side surface 451 and a convex image-side surface 452; and a glass sixth lens element 460 with negative refractive power having a concave object-side surface 461 and a convex image-side surface 462;

wherein the fifth lens element 450 and the sixth lens element 460 are cemented with each other to form a doublet; in the fourth embodiment of the present imaging optical lens assembly, the lens element with positive refractive power within the doublet is the fifth lens element 450, and the lens element with negative refractive power within the doublet is the sixth lens element 460;

wherein the aperture stop 400 is disposed between the fourth lens element 440 and the fifth lens element 450;

the imaging optical lens assembly further comprises an IR filter 470 disposed between the image-side surface 462 of the sixth lens element 460 and a cover glass 480, and the IR filter 470 is made of glass and has no influence on the focal length of the imaging optical lens assembly; the imaging optical lens assembly further comprises an image sensor provided on an image plane 490.

The detailed optical data of the fourth embodiment is shown in TABLE 4, wherein the units of the radius of curvature, the thickness and the focal length are expressed in mm, and HFOV is half of the maximal field of view.

TABLE 4

(Embodiment 4)
f = 2.68 mm, Fno = 2.05, HFOV = 77.0 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 29.309734 | 0.800 | Glass | 1.772 | 49.6 | −4.93 |
| 2 | | 3.330613 | 2.085 | | | | |
| 3 | Lens 2 | 6.026690 | 0.750 | Glass | 1.806 | 40.9 | −10.10 |
| 4 | | 3.270825 | 0.859 | | | | |
| 5 | Lens 3 | 7.662442 | 3.782 | Glass | 1.847 | 23.8 | 10.27 |
| 6 | | 50.000000 | 1.222 | | | | |
| 7 | Lens 4 | −37.872164 | 1.907 | Glass | 1.620 | 60.3 | 8.29 |
| 8 | | −4.613304 | 0.100 | | | | |
| 9 | Ape. Stop | Plano | 0.100 | | | | |
| 10 | Lens 5 | 6.987373 | 3.225 | Glass | 1.697 | 55.5 | 3.80 |
| 11 | | −3.448276 | 0.010 | Cement | | | |
| 12 | Lens 6 | −3.448276 | 1.605 | Glass | 1.847 | 23.8 | −5.55 |
| 13 | | −15.703776 | 1.300 | | | | |
| 14 | IR-filter | Plano | 0.150 | Glass | 1.517 | 64.2 | — |
| 15 | | Plano | 0.500 | | | | |
| 16 | Cover-glass | Plano | 0.300 | Glass | 1.517 | 64.2 | — |

TABLE 4-continued (Embodiment 4)
f = 2.68 mm, Fno = 2.05, HFOV = 77.0 deg.

| Surface # | | Curvature Radius | Thickness | Material | Index | Abbe # | Focal length |
|---|---|---|---|---|---|---|---|
| 17 | | Plano | 2.295 | | | | |
| 18 | Image | Plano | — | | | | |

Note:
Reference wavelength is d-line 587.6 mm
Lens 5 and lens 6 are connected with each other In the fourth embodiment of the present imaging optical lens assembly, the focal length of the imaging optical lens assembly is f, and it satisfies the relation: f=2.68 (mm).

In the fourth embodiment of the present imaging optical lens assembly, the f-number of the imaging optical lens assembly is Fno, and it satisfies the relation: Fno=2.05.

In the fourth embodiment of the present imaging optical lens assembly, half of the maximal field of view of the imaging optical lens assembly is HFOV, and it satisfies the relation: HFOV=77.0 deg.

In the fourth embodiment of the present imaging optical lens assembly, a refractive index of the sixth lens element 460 is N6, and it satisfies the following relation: N6=1.847.

In the fourth embodiment of the present imaging optical lens assembly, the on-axis spacing between the second lens element 420 and the third lens element 430 is T23, the on-axis spacing between the third lens element 430 and the fourth lens element 440 is T34, and they satisfy the relation: T23/T34=0.70.

In the fourth embodiment of the present imaging optical lens assembly, the radius of curvature of the image-side surface 422 of the second lens element 420 is R4, the radius of curvature of the object-side surface 431 of the third lens element 430 is R5, and they satisfy the relation: R4/R5=0.43.

In the fourth embodiment of the present imaging optical lens assembly, a radius of curvature of the object-side surface of the lens element with positive refractive power of the doublet is Ra, a radius of curvature of the image-side surface of the lens element with positive refractive power of the doublet is Rb, and they satisfy the following relation: (Ra+Rb)/(Ra−Rb)=0.34.

In the fourth embodiment of the present imaging optical lens assembly, a radius of curvature of the object-side surface of the lens element with negative refractive power of the doublet is Rc, a radius of curvature of the image-side surface of the lens element with negative refractive power of the doublet is Rd, and they satisfy the following relation: (Rc+Rd)/(Rc−Rd)=−1.56.

In the fourth embodiment of the present imaging optical lens assembly, the focal length of the fourth lens element 440 is f4, the focal length of the third lens element 430 is f3, and they satisfy the relation: f4/f3=0.81.

In the fourth embodiment of the present imaging optical lens assembly, a focal length of the imaging optical lens assembly is f, a focal length of the doublet connected by the fifth lens element 450 and the sixth lens element 460 is f56, and they satisfy the following relation: f/f56=0.28.

In the fourth embodiment of the present imaging optical lens assembly, a composite focal length of the first lens element 410, the second lens element 420 and the third lens element 430 is f123, a composite focal length of the fourth lens element 440, the fifth lens element 450 and the sixth lens element 460 is f456, and they satisfy the following relation: f123/f456=−1.05.

In the fourth embodiment of the present imaging optical lens assembly, an on-axis distance between the aperture stop 400 and the lens element with positive refractive power of the doublet is Dsa, an on-axis distance between the object-side surface 411 of the first lens element 410 and the image-side surface 462 of the sixth lens element 460 is Td, and they satisfy the following relation: Dsa/Td=0.01.

In the fourth embodiment of the present imaging optical lens assembly, half of the diagonal length of the effective sensing area of the image sensor is ImgH, a focal length of the imaging optical lens assembly is f, and they satisfy the following relation: ImgH/f=1.11

In the fourth embodiment of the present imaging optical lens assembly, the distance on the optical axis between the aperture stop 400 and the image plane 490 is SL, the distance on the optical axis between the object-side surface 411 of the first lens element 410 and the image plane 490 is TTL, and they satisfy the relation: SL/TTL=0.45.

Embodiment 5

Figure 5A:
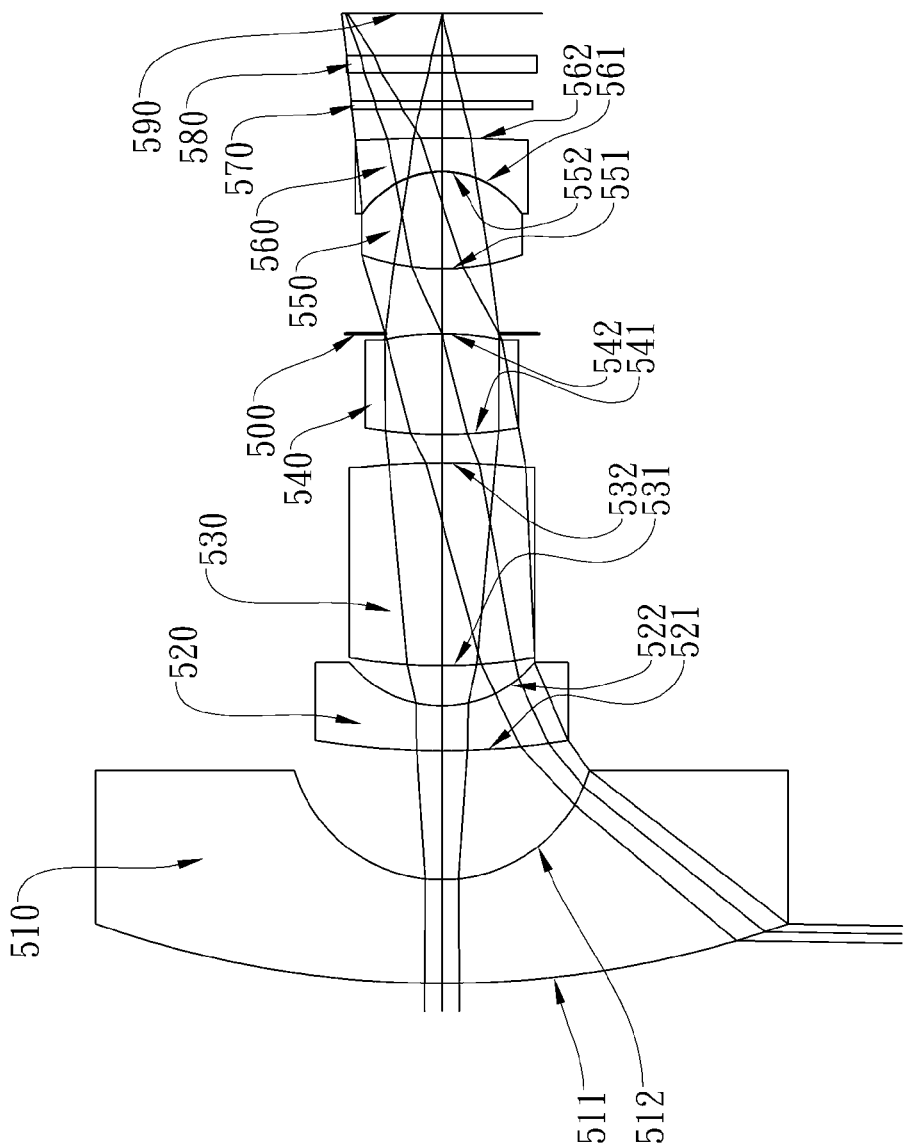
FIG. 5A shows an imaging optical lens assembly in accordance with a fifth embodiment of the present invention.
Figure 5B:
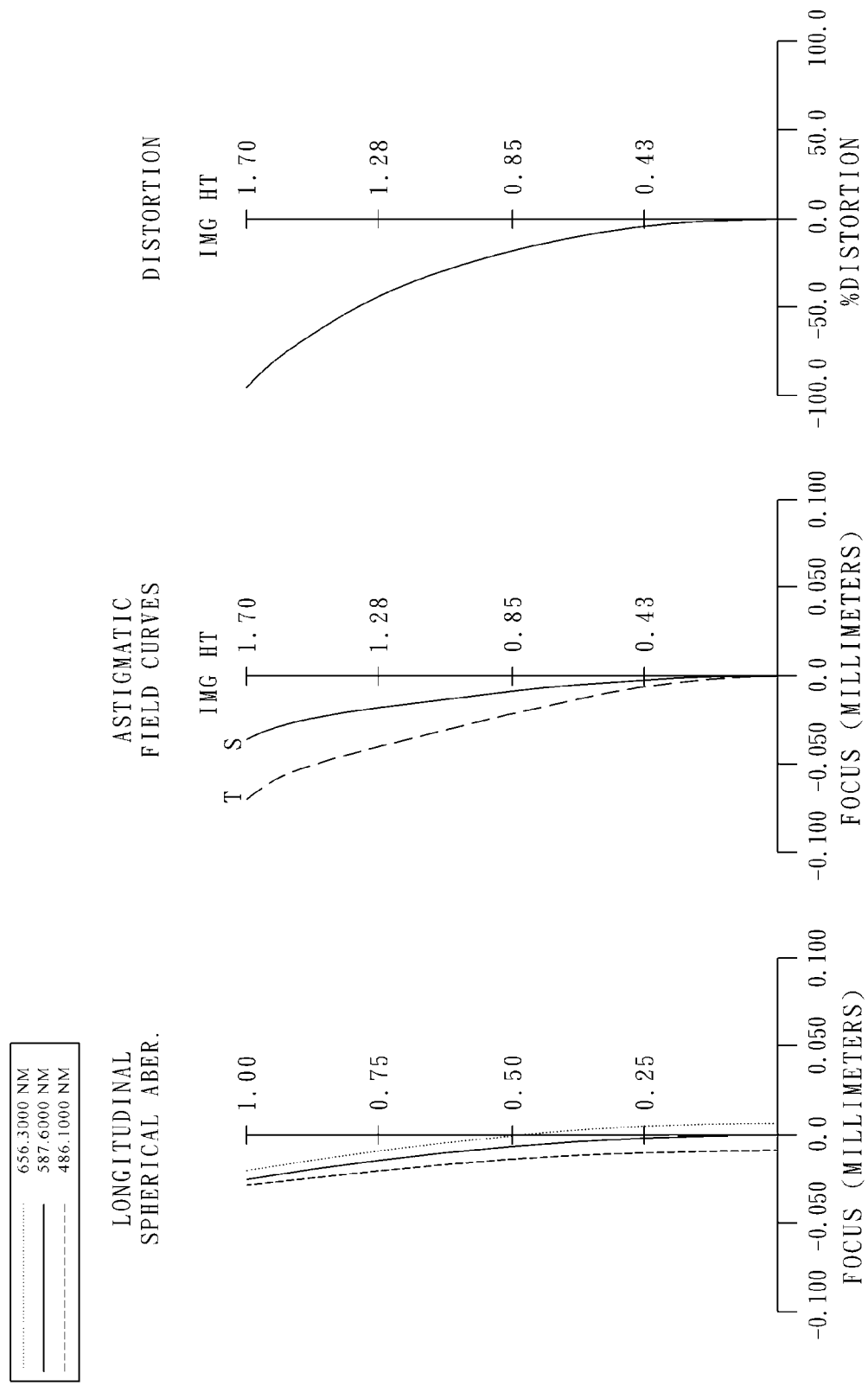
FIG. 5B shows the aberration curves of the fifth embodiment of the present invention.

FIG. 5A shows an imaging optical lens assembly in accordance with the fifth embodiment of the present invention, and FIG. 5B shows the aberration curves of the fifth embodiment of the present invention. The imaging optical lens assembly of the fifth embodiment of the present invention comprises, in order from an object side to an image side: a front lens group, an aperture stop 500 and a rear lens group; wherein the front lens group comprises, in order from the object side to the image side:

a glass first lens element 510 with negative refractive power having a convex object-side surface 511 and a concave image-side surface 512;

a glass second lens element 520 with negative refractive power having a convex object-side surface 521 and a concave image-side surface 522;

a glass third lens element 530 with positive refractive power having a convex object-side surface 531 and a convex image-side surface 532; and a glass fourth lens element 540 with positive refractive power having a convex object-side surface 541 and a convex image-side surface 542;

wherein the rear lens group comprises, in order from the object side to the image side:

a glass fifth lens element 550 with positive refractive power having a convex object-side surface 551 and a convex image-side surface 552; and a glass sixth lens element 560 with negative refractive power having a concave object-side surface 561 and a convex image-side surface 562;

wherein the fifth lens element 550 and the sixth lens element 560 are cemented with each other to form a doublet; in the fifth embodiment of the present imaging optical lens assembly, the lens element with positive refractive power within the doublet is the fifth lens element 550, and the lens element with negative refractive power within the doublet is the sixth lens element 560;

wherein the aperture stop 500 is disposed between the fourth lens element 540 and the fifth lens element 550;

the imaging optical lens assembly further comprises an IR filter 570 disposed between the image-side surface 562 of the sixth lens element 560 and a cover glass 580, and the IR filter 570 is made of glass and has no influence on the focal length of the imaging optical lens assembly; the imaging optical lens assembly further comprises an image sensor provided on an image plane 590.

The detailed optical data of the fifth embodiment is shown in TABLE 5, wherein the units of the radius of curvature, the thickness and the focal length are expressed in mm, and HFOV is half of the maximal field of view.

In the fifth embodiment of the present imaging optical lens assembly, a radius of curvature of the object-side surface of the lens element with positive refractive power of the doublet is Ra, a radius of curvature of the image-side surface of the lens element with positive refractive power of the doublet is Rb, and they satisfy the following relation: (Ra+Rb)/(Ra−Rb)= 0.42.

In the fifth embodiment of the present imaging optical lens assembly, a radius of curvature of the object-side surface of the lens element with negative refractive power of the doublet is Rc, a radius of curvature of the image-side surface of the lens element with negative refractive power of the doublet is Rd, and they satisfy the following relation: (Rc+Rd)/(Rc−Rd)=−1.14.

In the fifth embodiment of the present imaging optical lens assembly, the focal length of the fourth lens element 540 is f4,

TABLE 5

(Embodiment 5)
f = 1.25 mm, Fno = 2.05, HFOV = 88.9 deg.

| Surface # |  | Curvature Radius | Thickness | Material | Index | Abbe # | Focal length |
|---|---|---|---|---|---|---|---|
| 0 | Object | Plano | Infinity |  |  |  |  |
| 1 | Lens 1 | 18.328381 | 1.831 | Glass | 1.729 | 54.5 | −4.63 |
| 2 |  | 2.729992 | 2.285 |  |  |  |  |
| 3 | Lens 2 | 13.790212 | 0.800 | Glass | 1.805 | 25.4 | −3.25 |
| 4 |  | 2.145045 | 0.707 |  |  |  |  |
| 5 | Lens 3 | 9.351828 | 3.600 | Glass | 1.847 | 23.8 | 6.91 |
| 6 |  | −12.870878 | 0.500 |  |  |  |  |
| 7 | Lens 4 | 8.083978 | 1.779 | Glass | 1.697 | 56.2 | 4.74 |
| 8 |  | −5.083981 | 0.000 |  |  |  |  |
| 9 | Ape. Stop | Plano | 1.152 |  |  |  |  |
| 10 | Lens 5 | 4.207291 | 1.715 | Glass | 1.729 | 54.5 | 1.90 |
| 11 |  | −1.707381 | 0.010 | Cement |  |  |  |
| 12 | Lens 6 | −1.707381 | 0.600 | Glass | 1.847 | 23.8 | −2.18 |
| 13 |  | −25.782208 | 0.500 |  |  |  |  |
| 14 | IR-filter | Plano | 0.150 | Glass | 1.517 | 64.2 | — |
| 15 |  | Plano | 0.500 |  |  |  |  |
| 16 | Cover-glass | Plano | 0.300 | Glass | 1.517 | 64.2 | — |
| 17 |  | Plano | 0.748 |  |  |  |  |
| 18 | Image | Plano | — |  |  |  |  |

Note:
Reference wavelength is d-line 587.6 mm
Lens 5 and lens 6 are connected with each other In the fifth embodiment of the present imaging optical lens assembly, the focal length of the imaging optical lens assembly is f, and it satisfies the relation: f=1.25 (mm).

In the fifth embodiment of the present imaging optical lens assembly, the f-number of the imaging optical lens assembly is Fno, and it satisfies the relation: Fno=2.05.

In the fifth embodiment of the present imaging optical lens assembly, half of the maximal field of view of the imaging optical lens assembly is HFOV, and it satisfies the relation: HFOV=88.9 deg.

In the fifth embodiment of the present imaging optical lens assembly, a refractive index of the sixth lens element 560 is N6, and it satisfies the following relation: N6=1.847.

In the fifth embodiment of the present imaging optical lens assembly, the on-axis spacing between the second lens element 520 and the third lens element 530 is T23, the on-axis spacing between the third lens element 530 and the fourth lens element 540 is T34, and they satisfy the relation: T23/T34=1.41.

In the fifth embodiment of the present imaging optical lens assembly, the radius of curvature of the image-side surface 522 of the second lens element 520 is R4, the radius of curvature of the object-side surface 531 of the third lens element 530 is R5, and they satisfy the relation: R4/R5=0.23.

the focal length of the third lens element 530 is f3, and they satisfy the relation: f4/f3=0.69.

In the fifth embodiment of the present imaging optical lens assembly, a focal length of the imaging optical lens assembly is f, a focal length of the doublet connected by the fifth lens element 550 and the sixth lens element 560 is f56, and they satisfy the following relation: f/f56=0.18.

In the fifth embodiment of the present imaging optical lens assembly, a composite focal length of the first lens element 510, the second lens element 520 and the third lens element 530 is f123, a composite focal length of the fourth lens element 540, the fifth lens element 550 and the sixth lens element 560 is f456, and they satisfy the following relation: f123/f456=−0.98.

In the fifth embodiment of the present imaging optical lens assembly, an on-axis distance between the aperture stop 500 and the lens element with positive refractive power of the doublet is Dsa, an on-axis distance between the object-side surface 511 of the first lens element 510 and the image-side surface 562 of the sixth lens element 560 is Td, and they satisfy the following relation: Dsa/Td=0.08.

In the fifth embodiment of the present imaging optical lens assembly, half of the diagonal length of the effective sensing area of the image sensor is ImgH, a focal length of the imaging optical lens assembly is f, and they satisfy the following relation: ImgH/f=1.36.

In the fifth embodiment of the present imaging optical lens assembly, the distance on the optical axis between the aperture stop 500 and the image plane 590 is SL, the distance on the optical axis between the object-side surface 511 of the first lens element 510 and the image plane 590 is TTL, and they satisfy the relation: SL/TTL=0.32.

Embodiment 6

Figure 6A:
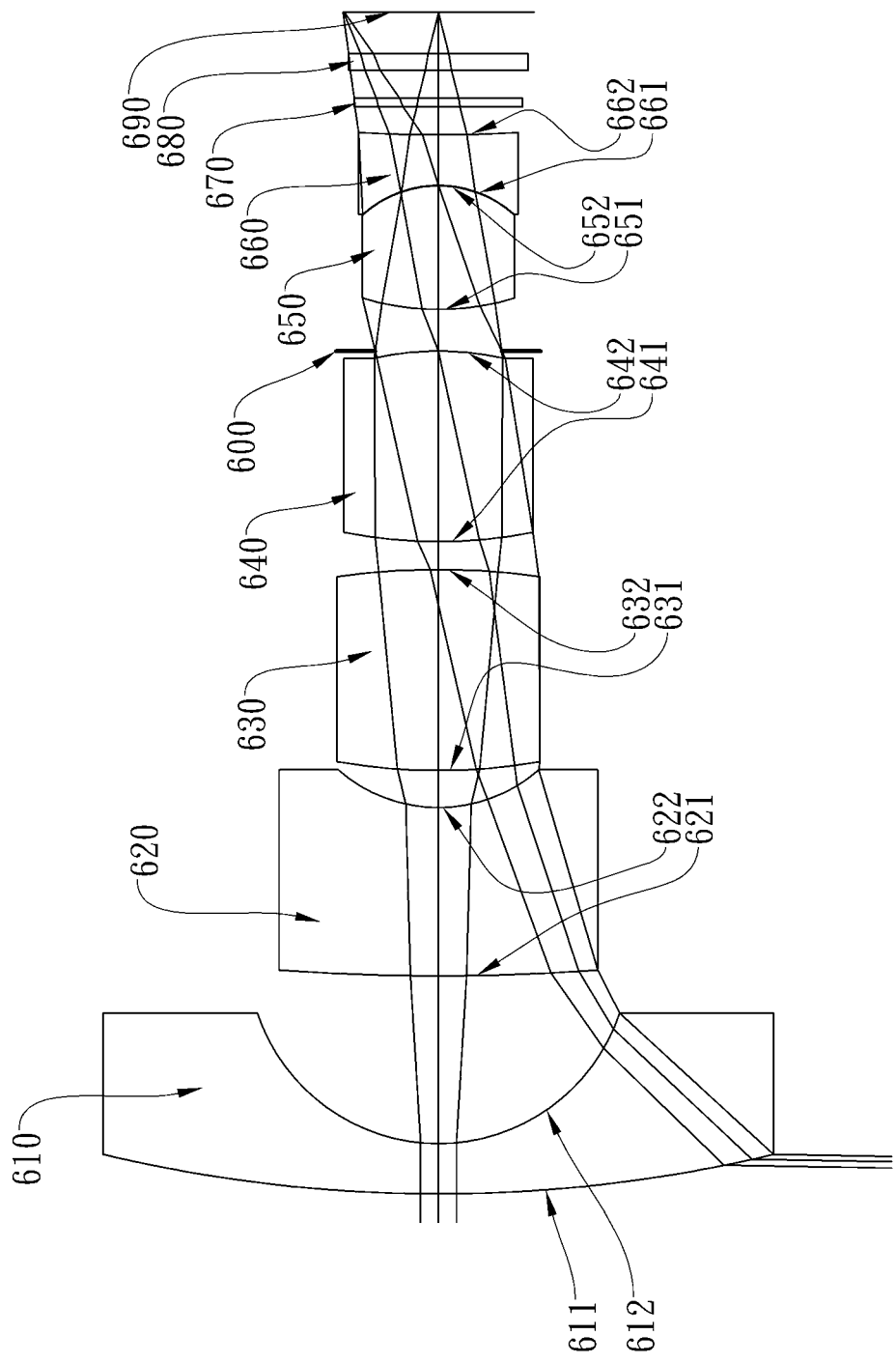
FIG. 6A shows an imaging optical lens assembly in accordance with a sixth embodiment of the present invention.
Figure 6B:
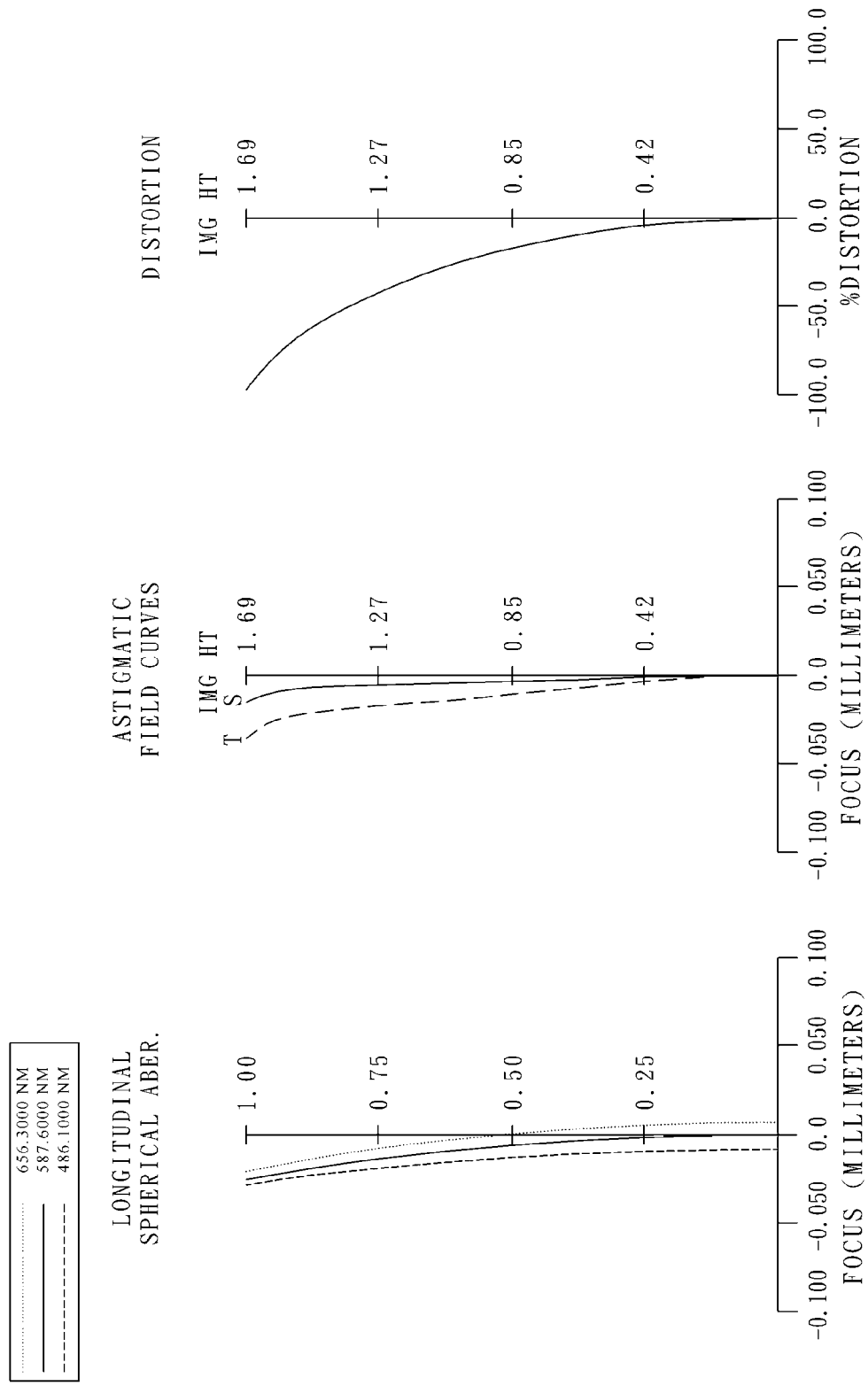
FIG. 6B shows the aberration curves of the sixth embodiment of the present invention.

FIG. 6A shows an imaging optical lens assembly in accordance with the sixth embodiment of the present invention, and FIG. 6B shows the aberration curves of the sixth embodiment of the present invention. The imaging optical lens assembly of the sixth embodiment of the present invention comprises, in order from an object side to an image side: a front lens group, an aperture stop 600 and a rear lens group; wherein the front lens group comprises, in order from the object side to the image side:

a glass first lens element 610 with negative refractive power having a convex object-side surface 611 and a concave image-side surface 612;

a glass second lens element 620 with negative refractive power having a convex object-side surface 621 and a concave image-side surface 622;

a glass third lens element 630 with positive refractive power having a convex object-side surface 631 and a convex image-side surface 632; and a glass fourth lens element 640 with positive refractive power having a convex object-side surface 641 and a convex image-side surface 642;

wherein the rear lens group comprises, in order from the object side to the image side:

a glass fifth lens element 650 with positive refractive power having a convex object-side surface 651 and a convex image-side surface 652; and a glass sixth lens element 660 with negative refractive power having a concave object-side surface 661 and a concave image-side surface 662;

wherein the fifth lens element 650 and the sixth lens element 660 are cemented with each other to form a doublet; in the sixth embodiment of the present imaging optical lens assembly, the lens element with positive refractive power within the doublet is the fifth lens element 650, and the lens element with negative refractive power within the doublet is the sixth lens element 660;

wherein the aperture stop 600 is disposed between the fourth lens element 640 and the fifth lens element 650;

the imaging optical lens assembly further comprises an IR filter 670 disposed between the image-side surface 662 of the sixth lens element 660 and a cover glass 680, and the IR filter 670 is made of glass and has no influence on the focal length of the imaging optical lens assembly; the imaging optical lens assembly further comprises an image sensor provided on an image plane 690.

The detailed optical data of the sixth embodiment is shown in TABLE 6, wherein the units of the radius of curvature, the thickness and the focal length are expressed in mm, and HFOV is half of the maximal field of view.

TABLE 6

(Embodiment 6)
f = 1.34 mm, Fno = 2.05, HFOV = 88.9 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 25.829257 | 0.900 | Glass | 1.729 | 54.5 | −5.49 |
| 2 | | 3.415470 | 3.004 | | | | |
| 3 | Lens 2 | 39.011860 | 3.015 | Glass | 1.805 | 25.4 | −3.77 |
| 4 | | 2.721369 | 0.664 | | | | |
| 5 | Lens 3 | 10.607716 | 3.600 | Glass | 1.847 | 23.8 | 7.43 |
| 6 | | −13.048816 | 0.500 | | | | |
| 7 | Lens 4 | 8.567473 | 3.412 | Glass | 1.697 | 56.2 | 5.38 |
| 8 | | −5.567471 | 0.000 | | | | |
| 9 | Ape. Stop | Plano | 0.745 | | | | |
| 10 | Lens 5 | 4.533182 | 2.216 | Glass | 1.729 | 54.5 | 2.24 |
| 11 | | −2.033179 | 0.010 | Cement | | | |
| 12 | Lens 6 | −2.033179 | 0.907 | Glass | 1.847 | 23.8 | −2.21 |
| 13 | | 28.938535 | 0.500 | | | | |
| 14 | IR-filter | Plano | 0.150 | Glass | 1.517 | 64.2 | — |
| 15 | | Plano | 0.500 | | | | |
| 16 | Cover-glass | Plano | 0.300 | Glass | 1.517 | 64.2 | — |
| 17 | | Plano | 0.746 | | | | |
| 18 | Image | Plano | — | | | | |

Note:
Reference wavelength is d-line 587.6 mm
Lens 5 and lens 6 are connected with each other In the sixth embodiment of the present imaging optical lens assembly, the focal length of the imaging optical lens assembly is f, and it satisfies the relation: f=1.34 (mm).

In the sixth embodiment of the present imaging optical lens assembly, the f-number of the imaging optical lens assembly is Fno, and it satisfies the relation: Fno=2.05.

In the sixth embodiment of the present imaging optical lens assembly, half of the maximal field of view of the imaging optical lens assembly is HFOV, and it satisfies the relation: HFOV=88.9 deg.

In the sixth embodiment of the present imaging optical lens assembly, a refractive index of the sixth lens element 660 is N6, and it satisfies the following relation: N6=1.847.

In the sixth embodiment of the present imaging optical lens assembly, the on-axis spacing between the second lens element 620 and the third lens element 630 is T23, the on-axis spacing between the third lens element 630 and the fourth lens element 640 is T34, and they satisfy the relation: T23/T34=1.33.

In the sixth embodiment of the present imaging optical lens assembly, the radius of curvature of the image-side surface 622 of the second lens element 620 is R4, the radius of curvature of the object-side surface 631 of the third lens element 630 is R5, and they satisfy the relation: R4/R5=0.26.

In the sixth embodiment of the present imaging optical lens assembly, a radius of curvature of the object-side surface of the lens element with positive refractive power of the doublet is Ra, a radius of curvature of the image-side surface of the lens element with positive refractive power of the doublet is Rb, and they satisfy the following relation: (Ra+Rb)/(Ra−Rb)= 0.38.

In the sixth embodiment of the present imaging optical lens assembly, a radius of curvature of the object-side surface of the lens element with negative refractive power of the doublet is Rc, a radius of curvature of the image-side surface of the lens element with negative refractive power of the doublet is Rd, and they satisfy the following relation: (Rc+Rd)/(Rc−Rd)=−0.87.

In the sixth embodiment of the present imaging optical lens assembly, the focal length of the fourth lens element 640 is f4, the focal length of the third lens element 630 is f3, and they satisfy the relation: f4/f3=0.72.

In the sixth embodiment of the present imaging optical lens assembly, a focal length of the imaging optical lens assembly is f, a focal length of the doublet connected by the fifth lens element 650 and the sixth lens element 660 is f56, and they satisfy the following relation: f/f56=0.13.

In the sixth embodiment of the present imaging optical lens assembly, a composite focal length of the first lens element 610, the second lens element 620 and the third lens element 630 is f123, a composite focal length of the fourth lens element 640, the fifth lens element 650 and the sixth lens element 660 is f456, and they satisfy the following relation: f123/f456=−0.94.

In the sixth embodiment of the present imaging optical lens assembly, an on-axis distance between the aperture stop 600 and the lens element with positive refractive power of the doublet is Dsa, an on-axis distance between the object-side surface 611 of the first lens element 610 and the image-side surface 662 of the sixth lens element 660 is Td, and they satisfy the following relation: Dsa/Td=0.04.

In the sixth embodiment of the present imaging optical lens assembly, half of the diagonal length of the effective sensing area of the image sensor is ImgH, a focal length of the imaging optical lens assembly is f, and they satisfy the following relation: ImgH/f=1.27.

In the sixth embodiment of the present imaging optical lens assembly, the distance on the optical axis between the aperture stop 600 and the image plane 690 is SL, the distance on the optical axis between the object-side surface 611 of the first lens element 610 and the image plane 690 is TTL, and they satisfy the relation: SL/TTL=0.28.

Embodiment 7

Figure 7A:
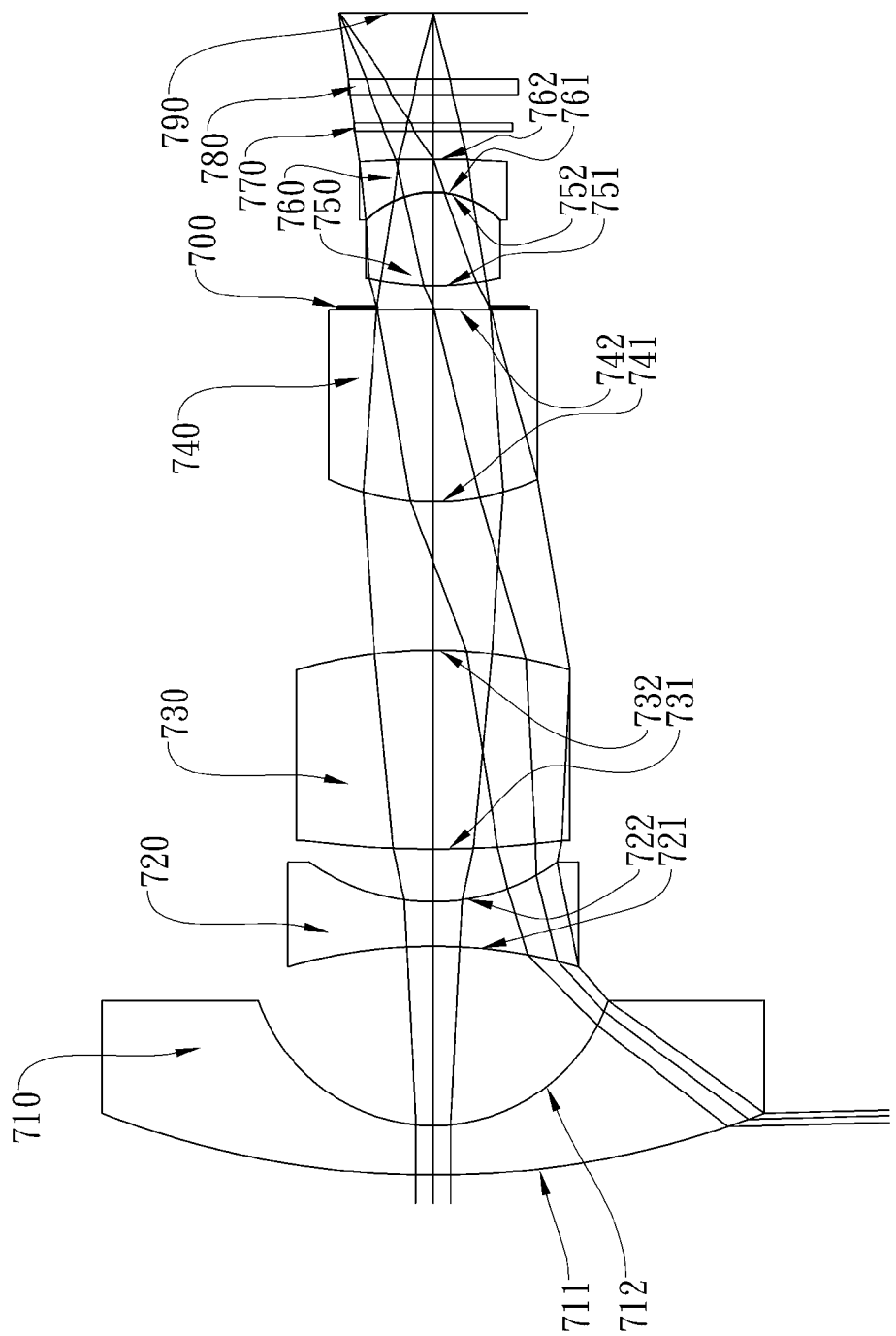
FIG. 7A shows an imaging optical lens assembly in accordance with a seventh embodiment of the present invention.
Figure 7B:
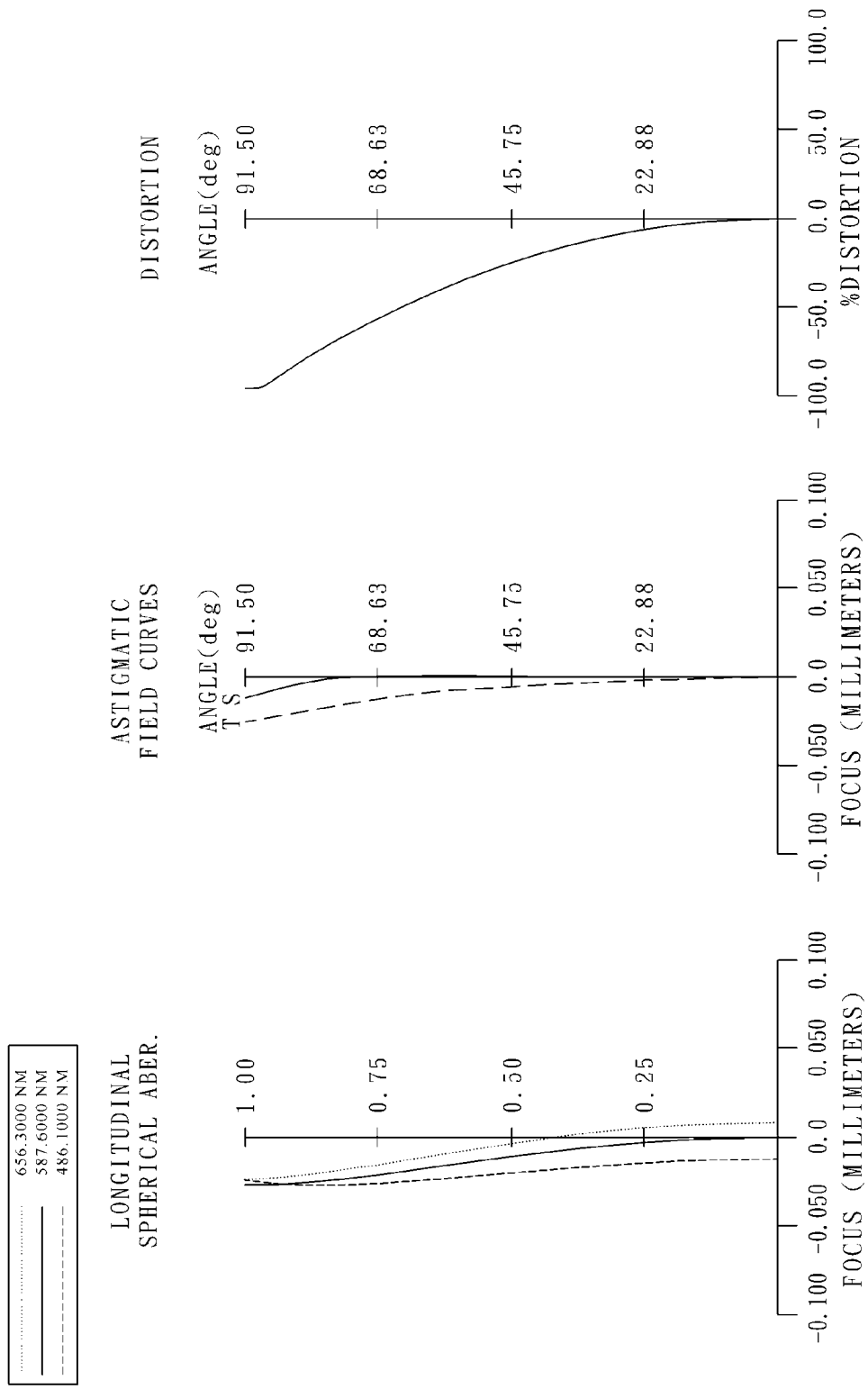
FIG. 7B shows the aberration curves of the seventh embodiment of the present invention.

FIG. 7A shows an imaging optical lens assembly in accordance with the seventh embodiment of the present invention, and FIG. 7B shows the aberration curves of the seventh embodiment of the present invention. The imaging optical lens assembly of the seventh embodiment of the present invention comprises, in order from an object side to an image side: a front lens group, an aperture stop 700 and a rear lens group; wherein the front lens group comprises, in order from the object side to the image side:

a glass first lens element 710 with negative refractive power having a convex object-side surface 711 and a concave image-side surface 712;

a glass second lens element 720 with negative refractive power having a concave object-side surface 721 and a concave image-side surface 722;

a glass third lens element 730 with positive refractive power having a convex object-side surface 731 and a convex image-side surface 732; and a glass fourth lens element 740 with positive refractive power having a convex object-side surface 741 and a convex image-side surface 742;

wherein the rear lens group comprises, in order from the object side to the image side:

a glass fifth lens element 750 with positive refractive power having a convex object-side surface 751 and a convex image-side surface 752; and a glass sixth lens element 760 with negative refractive power having a concave object-side surface 761 and a convex image-side surface 762;

wherein the fifth lens element 750 and the sixth lens element 760 are cemented with each other to form a doublet; in the seventh embodiment of the present imaging optical lens assembly, the lens element with positive refractive power within the doublet is the fifth lens element 750, and the lens element with negative refractive power within the doublet is the sixth lens element 760;

wherein the aperture stop 700 is disposed between the fourth lens element 740 and the fifth lens element 750;

the imaging optical lens assembly further comprises an IR filter 770 disposed between the image-side surface 762 of the sixth lens element 760 and a cover glass 780, and the IR filter 770 is made of glass and has no influence on the focal length of the imaging optical lens assembly; the imaging optical lens assembly further comprises an image sensor provided on an image plane 790.

The detailed optical data of the seventh embodiment is shown in TABLE 7, wherein the units of the radius of curvature, the thickness and the focal length are expressed in mm, and HFOV is half of the maximal field of view.

TABLE 7

(Embodiment 7)
f = 1.30 mm, Fno = 2.05, HFOV = 91.5 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 16.581370 | 0.900 | Glass | 1.729 | 54.5 | −5.91 |
| 2 | | 3.343880 | 3.247 | | | | |
| 3 | Lens 2 | −9.547603 | 0.800 | Glass | 1.805 | 25.4 | −3.32 |
| 4 | | 3.848259 | 0.961 | | | | |
| 5 | Lens 3 | 17.985216 | 3.600 | Glass | 1.847 | 23.8 | 7.39 |
| 6 | | −8.721138 | 2.690 | | | | |

TABLE 7-continued (Embodiment 7)
f = 1.30 mm, Fno = 2.05, HFOV = 91.5 deg.

| Surface # | | Curvature Radius | Thickness | Material | Index | Abbe # | Focal length |
|---|---|---|---|---|---|---|---|
| 7 | Lens 4 | 4.677341 | 3.486 | Glass | 1.697 | 56.2 | 6.24 |
| 8 | | −43.083448 | 0.034 | | | | |
| 9 | Ape. Stop | Plano | 0.386 | | | | |
| 10 | Lens 5 | 5.273298 | 1.691 | Glass | 1.729 | 54.5 | 1.98 |
| 11 | | −1.713788 | 0.010 | Cement | | | |
| 12 | Lens 6 | −1.713788 | 0.600 | Glass | 1.847 | 23.8 | −2.27 |
| 13 | | −18.502263 | 0.500 | | | | |
| 14 | IR-filter | Plano | 0.150 | Glass | 1.517 | 64.2 | — |
| 15 | | Plano | 0.500 | | | | |
| 16 | Cover-glass | Plano | 0.300 | Glass | 1.517 | 64.2 | — |
| 17 | | Plano | 1.193 | | | | |
| 18 | Image | Plano | — | | | | |

Note:
Reference wavelength is d-line 587.6 mm
Lens 5 and lens 6 are connected with each other In the seventh embodiment of the present imaging optical lens assembly, the focal length of the imaging optical lens assembly is f, and it satisfies the relation: f=1.30 (mm).

In the seventh embodiment of the present imaging optical lens assembly, the f-number of the imaging optical lens assembly is Fno, and it satisfies the relation: Fno=2.05.

In the seventh embodiment of the present imaging optical lens assembly, half of the maximal field of view of the imaging optical lens assembly is HFOV, and it satisfies the relation: HFOV=91.5 deg.

In the seventh embodiment of the present imaging optical lens assembly, a refractive index of the sixth lens element 760 is N6, and it satisfies the following relation: N6=1.847.

In the seventh embodiment of the present imaging optical lens assembly, the on-axis spacing between the second lens element 720 and the third lens element 730 is T23, the on-axis spacing between the third lens element 730 and the fourth lens element 740 is T34, and they satisfy the relation: T23/T34=0.36.

In the seventh embodiment of the present imaging optical lens assembly, the radius of curvature of the image-side surface 722 of the second lens element 720 is R4, the radius of curvature of the object-side surface 731 of the third lens element 730 is R5, and they satisfy the relation: R4/R5=0.21.

In the seventh embodiment of the present imaging optical lens assembly, a radius of curvature of the object-side surface of the lens element with positive refractive power of the doublet is Ra, a radius of curvature of the image-side surface of the lens element with positive refractive power of the doublet is Rb, and they satisfy the following relation: (Ra+Rb)/(Ra−Rb)=0.51.

In the seventh embodiment of the present imaging optical lens assembly, a radius of curvature of the object-side surface of the lens element with negative refractive power of the doublet is Rc, a radius of curvature of the image-side surface of the lens element with negative refractive power of the doublet is Rd, and they satisfy the following relation: (Rc+Rd)/(Rc−Rd)=−1.20.

In the seventh embodiment of the present imaging optical lens assembly, the focal length of the fourth lens element 740 is f4, the focal length of the third lens element 730 is f3, and they satisfy the relation: f4/f3=0.84.

In the seventh embodiment of the present imaging optical lens assembly, a focal length of the imaging optical lens assembly is f, a focal length of the doublet connected by the fifth lens element 750 and the sixth lens element 760 is f56, and they satisfy the following relation: f/f56=0.15.

In the seventh embodiment of the present imaging optical lens assembly, a composite focal length of the first lens element 710, the second lens element 720 and the third lens element 730 is f123, a composite focal length of the fourth lens element 740, the fifth lens element 750 and the sixth lens element 760 is f456, and they satisfy the following relation: f123/f456=−1.10.

In the seventh embodiment of the present imaging optical lens assembly, an on-axis distance between the aperture stop 700 and the lens element with positive refractive power of the doublet is Dsa, an on-axis distance between the object-side surface 711 of the first lens element 710 and the image-side surface 762 of the sixth lens element 760 is Td, and they satisfy the following relation: Dsa/Td=0.02.

In the seventh embodiment of the present imaging optical lens assembly, half of the diagonal length of the effective sensing area of the image sensor is ImgH, a focal length of the imaging optical lens assembly is f, and they satisfy the following relation: ImgH/f=1.29.

In the seventh embodiment of the present imaging optical lens assembly, the distance on the optical axis between the aperture stop 700 and the image plane 790 is SL, the distance on the optical axis between the object-side surface 711 of the first lens element 710 and the image plane 790 is TTL, and they satisfy the relation: SL/TTL=0.25.

It is to be noted that TABLES 1-7 show different data of the different embodiments, however, the data of the different embodiments are obtained from experiments. Therefore, any imaging optical lens assembly of the same structure is considered to be within the scope of the present invention even if it uses different data. The embodiments depicted above and the appended drawings are exemplary and are not intended to limit the scope of the present invention. TABLE 8 (illustrated in FIG. 8) shows the data of the respective embodiments resulting from the equations.

What is claimed is:

1. An imaging optical lens assembly comprising, in order from an object side to an image side: a front lens group, an aperture stop and a rear lens group;
wherein the front lens group comprises, in order from the object side to the image side:
a first lens element with negative refractive power having a concave image-side surface;

a second lens element with negative refractive power having a concave image-side surface;
a third lens element with positive refractive power; and
a fourth lens element with positive refractive power;
wherein the rear lens group comprises, in order from the object side to the image side:
a fifth lens element with positive refractive power; and
a sixth lens element with negative refractive power;
wherein the imaging optical lens assembly is a fixed focal length lens assembly, and the front lens group has a total of four lens elements and the rear lens group has only two lens elements;
wherein a distance on the optical axis between the aperture stop and an image plane is SL, a distance on the optical axis between the object-side surface of the first lens element and the image plane is TTL, an image sensor is provided on an image plane, half of a diagonal length of an effective sensing area of the image sensor is ImgH, the focal length of the imaging optical lens assembly is f, the fifth lens element and the sixth lens element are connected to form a doublet; a radius of curvature of the image-side surface of the second lens element is R4, a radius of curvature of the object-side surface of the third lens element is R5, a radius of curvature of the object-side surface of the lens element with negative refractive power of the doublet is Rc, a radius of curvature of the image-side surface of the lens element with negative refractive power of the doublet is Rd, and they satisfy the following relations:

$0.2 < SL/TTL < 0.5;$ $ImgH/f > 1.0;$ $-0.5 < R4/R5 < 0.5;$ and $-5.0 < (Rc+Rd)/(Rc-Rd) < 0.0.$ 2. The imaging optical lens assembly according to claim 1, wherein a radius of curvature of the object-side surface of the lens element with positive refractive power of the doublet is Ra, a radius of curvature of the image-side surface of the lens element with positive refractive power of the doublet is Rb, and they satisfy the following relation:

$0.1 < (Ra+Rb)/(Ra-Rb) < 0.7.$

3. The imaging optical lens assembly according to claim 1, wherein a focal length of the fourth lens element is f4, a focal length of the third lens element is f3, and they satisfy the following relation:

$0.5 < f4/f3 < 1.3.$

4. The imaging optical lens assembly according to claim 1, wherein an on-axis distance between the aperture stop and the lens element with positive refractive power of the doublet is Dsa, an on-axis distance between the object-side surface of the lens element with refractive power closest to the imaged object and the image-side surface of the lens element with refractive power closest to the image plane of the imaging optical lens assembly is Td, and they satisfy the following relation:

$-0.1 < Dsa/Td < 0.09.$

5. The imaging optical lens assembly according to claim 1, wherein a refractive index of the sixth lens element is N6, and it satisfies the relation:

$N6 > 1.80.$

6. The imaging optical lens assembly according to claim 2, wherein an on-axis spacing between the second lens element and the third lens element is T23, an on-axis spacing between the third lens element and the fourth lens element is T34, and they satisfy the following relation:

$0.05 < T23/T34 < 0.80.$

7. The imaging optical lens assembly according to claim 2, wherein the radius of curvature of the object-side surface of the lens element with positive refractive power of the doublet is Ra, the radius of curvature of the image-side surface of the lens element with positive refractive power of the doublet is Rb, and they satisfy the following relation:

$0.25 < (Ra+Rb)/(Ra-Rb) < 0.55.$

8. The imaging optical lens assembly according to claim 2, wherein the focal length of the fourth lens element is f4, the focal length of the third lens element is f3, and they satisfy the following relation:

$0.8 < f4/f3 < 1.2.$

9. The imaging optical lens assembly according to claim 1, wherein a focal length of the imaging optical lens assembly is f, a focal length of the doublet connected by the fifth lens element and the sixth lens element is f56, and they satisfy the following relation:

$0.1 < f/f56 < 0.3.$

10. The imaging optical lens assembly according to claim 9, wherein a composite focal length of the first lens element, the second lens element and the third lens element is f123, a composite focal length of the fourth lens element and the doublet is f456, there are no intervening lenses between the first through sixth lens elements, and they satisfy the following relation:

$-1.3 < f123/f456 < -0.9.$

11. The imaging optical lens assembly according to claim 9, wherein half of the maximal field of view of the imaging optical lens assembly is HFOV, and it satisfies the following relation:

$HFOV > 80.$

12. An imaging optical lens assembly comprising six lens elements with refractive power, in order from an object side to an image side:
a first lens element with negative refractive power having a concave image-side surface;
a second lens element with negative refractive power having a concave image-side surface;
a third lens element with positive refractive power;
a fourth lens element with positive refractive power;
a fifth lens element with positive refractive power; and
a sixth lens element with negative refractive power;
wherein the imaging optical lens assembly is a fixed focal length lens assembly;
wherein the imaging optical lens assembly further comprises an aperture stop;
wherein a focal length of the imaging optical lens assembly is f, a focal length of the doublet connected by the fifth lens element and the sixth lens element is f56, a radius of curvature of the object-side surface of the lens element with negative refractive power of the doublet is Rc, a radius of curvature of the image-side surface of the lens element with negative refractive power of the doublet is Rd, an image sensor is provided on an image plane, half of a diagonal length of an effective sensing area of the image sensor is ImgH, the focal length of the imaging optical lens assembly is f, the fifth lens element and the sixth lens element are connected to form a doublet; a radius of curvature of the image-side surface of the second lens element is R4, a radius of curvature of the object-side surface of the third lens element is R5, an on-axis distance between the aperture stop and the lens element with positive refractive power of the doublet is Dsa, an on-axis distance between the object-side surface of the lens element with refractive power closest to the imaged object and the image-side surface of the lens element with refractive power closest to the image plane of the imaging optical lens assembly is Td, a distance on the optical axis between the aperture stop and an image plane is SL, a distance on the optical axis between the object-side surface of the first lens element and the image plane is TTL, and they satisfy the following relation:

$0.1 < f/f56 < 0.3;$ $-5.0 < (Rc+Rd)/(Rc-Rd) < 0.0;$ $ImgH/f > 1.0;$ $-0.5 < R4/R5 < 0.5;$ $-0.1 < Dsa/Td < 0.09;$ and $0.2 < SL/TTL < 0.5.$

13. The imaging optical lens assembly according to claim 12, wherein the radius of curvature of the object-side surface of the lens element with negative refractive power of the doublet is Rc, the radius of curvature of the image-side surface of the lens element with negative refractive power of the doublet is Rd, and they satisfy the following relations:

$-3.0 < (Rc+Rd)/(Rc-Rd) < -0.6.$

14. The imaging optical lens assembly according to claim 12, wherein a radius of curvature of the object-side surface of the lens element with positive refractive power of the doublet is Ra, a radius of curvature of the image-side surface of the lens element with positive refractive power of the doublet is Rb, and they satisfy the following relation:

$0.25 < (Ra+Rb)/(Ra-Rb) < 0.55.$

15. The imaging optical lens assembly according to claim 12, wherein a composite focal length of the first lens element, the second lens element and the third lens element is f123, a composite focal length of the fourth lens element, the fifth lens element, and the sixth lens element is f456, there are no intervening lenses between the first through sixth lens elements, and they satisfy the following relation:

$-1.3 < f123/f456 < -0.9.$

16. The imaging optical lens assembly according to claim 15, wherein the focal length of the fourth lens element is f4, the focal length of the third lens element is f3, and they satisfy the following relation:

$0.8 < f4/f3 < 1.2.$

17. The imaging optical lens assembly according to claim 15, wherein an on-axis spacing between the second lens element and the third lens element is T23, an on-axis spacing between the third lens element and the fourth lens element is T34, and they satisfy the following relation:

$0.05 < T23/T34 < 0.80.$

18. The imaging optical lens assembly according to claim 15, wherein a refractive index of the sixth lens element is N6, and it satisfies the relation:

$N6 > 1.80.$

\* \* \* \* \*